United States Patent
Hanson et al.

(10) Patent No.: US 12,107,957 B2
(45) Date of Patent: Oct. 1, 2024

(54) POINT-OF-SERVICE DIGITAL IDENTITY VERIFICATION DEVICE

(71) Applicant: Credence ID, LLC, Oakland, CA (US)

(72) Inventors: Bruce Hanson, San Francisco, CA (US); Yash Shah, Lafayette, CA (US); Kai Aiello, Medford, OR (US); Suman Kumar Sanjeev Prasanna, Pleasanton, CA (US); Smit S. Patel, Emeryville, CA (US)

(73) Assignee: Credence ID, LLC, Oakland, CA (US)

( * ) Notice: Subject to any disclaimer, the term of this patent is extended or adjusted under 35 U.S.C. 154(b) by 0 days.

(21) Appl. No.: 18/532,261

(22) Filed: Dec. 7, 2023

(65) Prior Publication Data
US 2024/0195622 A1    Jun. 13, 2024

Related U.S. Application Data

(60) Provisional application No. 63/386,427, filed on Dec. 7, 2022.

(51) Int. Cl.
*H04L 9/32* (2006.01)
*G06F 21/32* (2013.01)
*G06F 21/45* (2013.01)

(52) U.S. Cl.
CPC ............ *H04L 9/321* (2013.01); *G06F 21/32* (2013.01); *G06F 21/45* (2013.01)

(58) Field of Classification Search
USPC .......................................................... 713/156
See application file for complete search history.

(56) References Cited

U.S. PATENT DOCUMENTS 5,996,076 A * 11/1999 Rowney ................ G06Q 20/12
705/76
7,457,950 B1    11/2008 Brickell et al.
(Continued)

FOREIGN PATENT DOCUMENTS

EP    3036675 A4    7/2017
EP    3809358 A1    4/2021
(Continued)

OTHER PUBLICATIONS

Mazhelis ("An integrated identity verification system for mobile terminals"), Emerald, Information Management & Computer Security, 13.5: 367-78. (Year: 2005).*
(Continued)

*Primary Examiner* — Sakinah White Taylor
(74) *Attorney, Agent, or Firm* — Holzer Patel Drennan

(57) ABSTRACT

An identity verification device for verification of a digital credential includes a user device communication interface for operative communication with a user device associated with a human user. The user device communication interface is operative to receive from the user device the digital credential of the human user stored locally on the user device. The device also includes a relying party communication interface operative to send a request to an intermediary credential service platform for verification of the digital credential presented by the user device, and to receive verification of the digital credential from the platform after application of an issuing authority credentialing standard to the digital credential. The device further includes a verification indicator operative to provide an indication of verification status of the digital credential to the relying party associated with the identity verification device.

30 Claims, 9 Drawing Sheets

(56) References Cited

U.S. PATENT DOCUMENTS

| | | | |
|---|---|---|---|
| 8,104,074 B2 | 1/2012 | Cameron et al. | |
| 9,213,992 B2 | 12/2015 | Steeves | |
| 9,280,684 B1 | 3/2016 | Kragh | |
| 9,805,213 B1 | 10/2017 | Kragh | |
| 10,163,185 B1* | 12/2018 | Yarker | B60K 35/00 |
| 10,255,419 B1 | 4/2019 | Kragh | |
| 10,657,233 B1* | 5/2020 | Wallbom | G06F 21/31 |
| 11,323,420 B2 | 5/2022 | Bankston et al. | |
| 11,405,189 B1 | 8/2022 | Bennison | |
| 11,595,202 B1 | 2/2023 | Stewart et al. | |
| 11,663,306 B2 | 5/2023 | Polychronidis et al. | |
| 12,001,529 B1* | 6/2024 | Anderson | G06F 21/31 |
| 2002/0144119 A1* | 10/2002 | Benantar | H04L 9/3263 |
| | | | 713/171 |
| 2003/0163686 A1 | 8/2003 | Ward et al. | |
| 2006/0206925 A1* | 9/2006 | Dillaway | G06F 21/33 |
| | | | 726/5 |
| 2008/0028215 A1 | 1/2008 | Nanda et al. | |
| 2008/0120240 A1 | 5/2008 | Ginter et al. | |
| 2009/0217362 A1 | 8/2009 | Nanda et al. | |
| 2010/0250955 A1 | 9/2010 | Trevithick et al. | |
| 2010/0281253 A1* | 11/2010 | Bourne | H04L 63/104 |
| | | | 713/156 |
| 2011/0204142 A1 | 8/2011 | Rao | |
| 2013/0024384 A1* | 1/2013 | Beenau | G06Q 20/327 |
| | | | 340/5.82 |
| 2017/0140374 A1 | 5/2017 | O'Brien et al. | |
| 2017/0180128 A1 | 6/2017 | Lu | |
| 2018/0012324 A1 | 1/2018 | Kelts | |
| 2018/0123804 A1 | 5/2018 | Smith et al. | |
| 2018/0173871 A1 | 6/2018 | Toth | |
| 2018/0254909 A1* | 9/2018 | Hancock | H04L 9/3268 |
| 2019/0087519 A1 | 3/2019 | Mercury et al. | |
| 2019/0089701 A1* | 3/2019 | Mercury | G06Q 10/105 |
| 2019/0097812 A1 | 3/2019 | Toth | |
| 2019/0354665 A1 | 11/2019 | Haslam et al. | |
| 2020/0036707 A1 | 1/2020 | Callahan et al. | |
| 2020/0259643 A1 | 8/2020 | Pazhoor et al. | |
| 2020/0342459 A1 | 10/2020 | Boyle et al. | |
| 2020/0410123 A1 | 12/2020 | Chen et al. | |
| 2022/0076262 A1 | 3/2022 | Boyd et al. | |
| 2022/0122170 A1 | 4/2022 | Du | |
| 2022/0138769 A1 | 5/2022 | Olson et al. | |
| 2022/0158855 A1 | 5/2022 | Wentz | |
| 2022/0166769 A1 | 5/2022 | Kwon et al. | |
| 2022/0301088 A1* | 9/2022 | Vemury | G06F 16/22 |
| 2023/0125318 A1* | 4/2023 | Shear | H04L 47/70 |
| | | | 709/226 |
| 2023/0132554 A1 | 5/2023 | Kravitz et al. | |
| 2023/0145439 A1 | 5/2023 | Suk | |
| 2024/0028107 A1 | 1/2024 | Willardson et al. | |

FOREIGN PATENT DOCUMENTS

| | | |
|---|---|---|
| WO | 2009155129 A2 | 12/2009 |
| WO | 2017092861 A1 | 6/2017 |
| WO | 2021123031 A1 | 6/2021 |
| WO | 2022133026 A1 | 6/2022 |
| WO | 2022214773 A1 | 10/2022 |

OTHER PUBLICATIONS

International Searching Authority, U.S. Patent and Trademark Office, International Search Report and Written Opinion for PCT/US2023/082924, date mailed: Apr. 3, 2024, 20 pages.

Hardman et al. Using Biometrics to Fight Credential Fraud. IEEE Communications Standards Magazine, vol. 3, Issue: 4. https://ieeexplore.ieee.org/stamp/stamp.jsp?tp=&arnumber=903154 7 (Year: 2019).

Notice of Allowance Issued in U.S. Appl. No. 18/532,335, Mailed Date: May 8, 2024, 11 Pages.

Othman et al. The Horcrux Protocol: A Method for Decentralized Biometric-based Self-sovereign Identity. 2018. International Joint Conference on Neural Networks (IJCNN). https://ieeexplore.ieee.org/stamp/stamp.jsp?tp=&arnumber=8489316 ( Year: 2018).

Sasso et al. A Proposal for a Unified Identity Card for Use in an Academic Federation Environment. 2014 Ninth International Conference on Availability, Reliability and Security. https://ieeexplore.ieee.org/stamp/stamp.jsp?tp=&arnumber= 6980291 (Year: 2014).

* cited by examiner

POINT-OF-SERVICE DIGITAL IDENTITY VERIFICATION DEVICE

CROSS-REFERENCE TO RELATED APPLICATIONS

This application claims priority to U.S. Provisional Application No. 63/386,427 filed on Dec. 7, 2022 entitled "POINT-OF-SERVICE DIGITAL IDENTITY VERIFICATION DEVICE," the entirety of which is incorporated by reference herein.

BACKGROUND

Traditionally, physical identification documents have been used for proof of identity. Common examples include use of a driver's license or passport to verify a person's age or identity. In recent times, use of digital credentials for use in identifying a person has been proposed. As such, digital identity verification is increasingly utilized for many day-to-day services in both the physical and online world. While self-issued digital credentials (e.g., emails, passwords, keys, etc.) are sufficient for some low assurance level transactions, many transactions require higher assurance levels of identity verification. Currently, the process of identity verification includes less reliable and more costly methods such as scanning images of physical identification documents and taking "selfie" pictures. These processes are not only time consuming, but also prone to algorithmic and human errors increasing risk to relying parties and creating frustration for end-users. Furthermore, verification of identification is currently incumbent on the relying party, which places a burden on the relying party to have sufficient knowledge and/or technical acumen to accurately verify a credential for identification.

Furthermore, current identification verification processes using physical documents must be repeated again and again for transactions such as border crossings and cross-organization presentation of credentials. Replacing verification of physical credentials with verification of digital credentials provides significant benefits in terms of accuracy, cost, time, security, and end-user-experience for many day-to-day services. However, at present it is difficult to confirm the cryptographic veracity of digital credentials generated by a trusted issuing authority as presented on a user device.

Multiple independent standards and credentialing organizations around the world have been developing international standards and frameworks for issuing and accepting digital identities in an effort to facilitate interoperability and resolve acceptance and usability issues. For example, accredited issuing authorities around the world are adopting standards-based reusable digital identification to provide relying parties with a cost-effective and accurate way to verify identity while enabling end-user control over the use of their identities. However, even in the presence of such standards, the interaction between an end user and a relying party remains complex and fraught with the potential for errors in identity verification.

SUMMARY

In one example implementation, an identity verification device for verification of a digital credential includes a computer processor, a memory, a user device communication interface, a relying party communication interface, and a verification indicator. The memory stores an application executable by the computer processor to implement a verification process that verifies authenticity of the digital credential. The user device communication interface is configured for operative communication with a user device associated with a human user and is operative to receive from the user device the digital credential of the human user stored locally on the user device. The relying party communication interface is operative to send a request to an intermediary credential service platform for verification of the digital credential presented by the user device. The request includes an indication of a specific issuing authority credential standard required by the identity verification device according to a configuration prescribed by a relying party associated with the identity verification device. The relying party communication interface is also operative to receive verification of the digital credential from the intermediary credential service platform after application of the issuing authority credentialing standard to the digital credential. The issuing authority credentialing standard is selected from a plurality of issuing authority credentialing standards stored in a digital identity credentialing database maintained by the intermediary credential service platform. The verification indicator is operative to provide an indication of verification status to the relying party associated with the identity verification device.

In another example implementation, a credential verification device for verification of a user digital credential includes a computer processor, a memory, a verification engine, data communication interface, and a verification indicator. The memory stores a standards abstraction layer including a digital identity credentialing database including a plurality of issuing authority credentialing standards that each define the protocol of data exchange and verification technology used by a digital credentials issued by an issuing authority. The memory also stores a verification engine application executable by the computer processor to implement a verification process that verifies authenticity of the digital credential. The verification engine is implemented by the processor according to the verification engine application and is operative to calculate the credentialing standard used by the presented digital credential. This information is passed to the data communication interface that is operative to exchange the data from the user credential to the verification device. The received data is passed back to the verification engine. The verification engine subsequently accesses the digital identity credentialing database to retrieve the corresponding issuing authority with the user digital credential and apply the issuing authority trust mechanism (e.g., credentialing standard) to the user digital credential data to perform a verification operation on the user digital credential and output a verification status. The user device communication interface is operative to communicate with a user device associated with a human user. The user device communication interface is also operative to receive from the user device the user digital credential of the human user stored locally on the user device. The verification indicator is operative to provide an indication of the verification status to the relying party associated with the identification verification device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other implementations are also described and recited herein.

DETAILED DESCRIPTION

Figure 1:
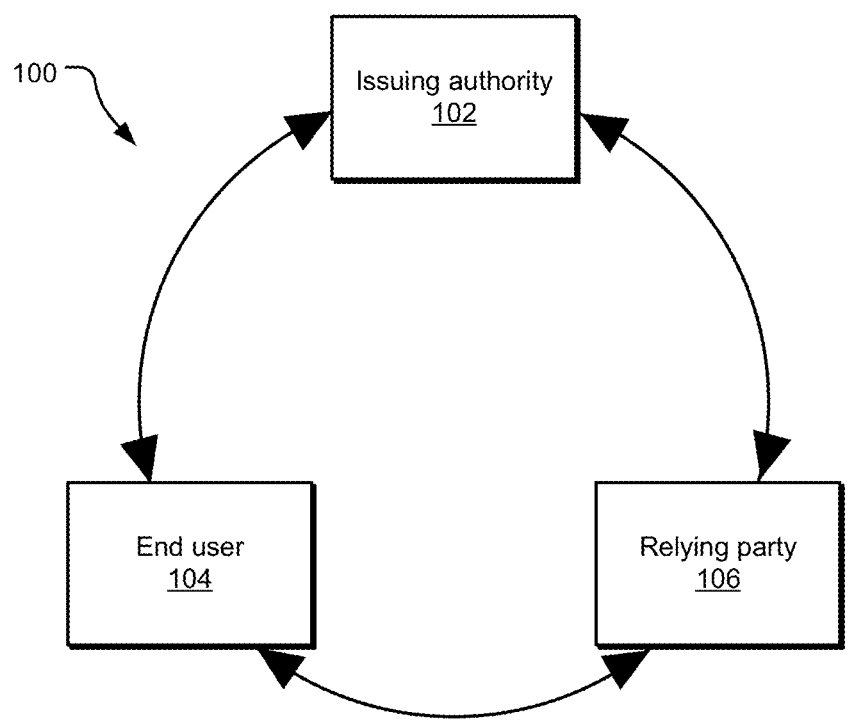
FIG. 1 illustrates an example ecosystem in which digital identifications may be used to verify a human user.

While disclosed embodiments are susceptible to various modifications and alternative forms, specific embodiments are shown by way of example in the drawings and are herein described in detail. It should be understood, however, that this description is not intended to limit the invention to the particular forms disclosed, but rather, the invention is to cover all modifications, equivalents, and alternatives falling within the scope of the invention as defined by the claims.

As noted above, digital credentials provided by issuing authorities for purposes of verification of a user's identity are increasingly being used by end users and relying parties. Relying parties may verify a digital credential to verify a human user's identity in contexts where physical identification documents have previously been utilized. In relation to presentation of digital credentials for identity verification, a number of standards have been proposed or created. In particular, ISO 18013-5 for mobile driving license (mDL) and W3C Verifiable Credentials (VC) have been proposed. These standards represent the latest evolution from traditional physical credentials to digital credentials that are electronically stored and communicated for purposes of verifying a user's identity. Such digital credentials may be cryptographically secured such that the digital credentials are not just a mere digital picture of physical credentials such as the physical driver's license. In addition to being cryptographically secure, digital credentials may be biometrically verified digital documents. Digital credentials are preferably selectively shared with relying parties only after the user's consent. Using standards based reusable digital identity verification, end-users can retain control over when and what data to disclose to different relying parties, gain portability of identity information and support for assurance levels using mobile devices, and present digital credentials to a verifier in a consent-driven, privacy-preserving way for the end user.

Despite the increasing use of such digital identity standards, there are a number of challenges that continue to persist in relation to use of digital credentials for identity verification. For example, multiple, different channels may be provided for the issuance and storage of digital credentials. This may include use of different applications, storage modalities, wallet applications, or other approaches to distribute, store, and exchange digital credentials. As noted above, in current implementations, it may be incumbent on a relying party to verify a digital credential. Accordingly, relying parties may be required to support a number of different digital credential modalities that may each have unique standards, protocols, and/or other workflows to verify a user's identity using a digital credential. This complexity is compounded when identity verification is incorporated into different relying party workflows that may have different requirements as it relates to digital identity verification. Further still, in view of the potential sensitivity of the information provided by digital credentials, any framework for use of digital identities must support privacy and consent management for end users. As such, while standards for digital credentials have been proposed, difficulties remain for effective use of digital credentials by end users and relying parties to effectuate identification verification using digital credentials.

As such, the present disclosure provides a platform-centric approach to identity verification using digital credentials that advantageously combines hardware, software, and services to enable acceptance of digital credentials issued by accredited issuing authorities for use in identity verification, thus resulting in higher security and trust compared to relying on physical credentials as the root source of assurance. A digital identity verification platform also preferably provides a frequent, and low friction identification verification experience for end users avoiding lock-in to just one set of issuers, wallets, or verifiers for maintaining digital credentials. Furthermore, a platform preferably integrates with relying party workflows to not only accept high-volume digital credentials cost-effectively, but also to unlock improved user experiences in the hybrid physical and online world.

Accordingly, the platform described herein may provide a comprehensive solution for relying parties to accept and verify reusable digital credentials including mDLs, VCs, mobile documents (mdocs), self-sovereign identity (SSI), or any other cryptographically verified identity issued by different states, nations, enterprises, or agencies that may be presented by different wallet applications. The present disclosure may enable government agencies and private enterprises to confidently succeed in in-person and on-line environments across multi-wallet universes. Specifically, the platform described herein facilitates multi-channel identification acceptance and verification by orchestrating secure access between the wallet application of the end user's choice and a relying party's digital infrastructure. The relying party can use such a platform to accept multiple digital credentials across their customer channels for identification verification through a robust set of service and device management layers and identity driven enterprise applications to manage identity verification needs across their business.

FIG. 1 illustrates an example ecosystem 100 in which digital identifications may be used to verify a human user. The ecosystem 100 includes an issuing authority 102. The issuing authority 102 may be any appropriate entity that may issue a digital credential to an end user 104, who may be a human user uniquely associated with the digital credential. In this regard, the digital credential may be used by the end user 104 for purposes of verifying the identity of the end user 104. As used herein, a digital credential may refer to any cryptographically secure digital data. Digital credentials that relate to an identity of a user may be referred to simply as digital identities. Such examples of digital identities may include the issuance of a mDL from a government agency, identification documents such as a passport from a government agency, credentialing information from an entity (e.g., passes, access keys, etc.), loyalty program identification from a business, payment identification from a financial institution, or any other appropriate digital credential that is cryptographically secure that an issuing authority 102 may provide to the end user 104.

In turn, the end user 104 may seek to use a digital credential to verify the identity of the end user 104 to a relying party 106. Again, the relying party 106 may be any entity that seeks to identify or gain verified information regarding the end user 104. Examples of a relying party 106 may be governmental entities, business entities, vendors, other human users, or the like. As an example, the relying party 106 may include any entity that would traditionally require production of physical identification documents (e.g., for age restricted purchases, to satisfy "know your customer" regulations, or the like).

While advances in standards for formatting and communication of digital credentials may have occurred, in the ecosystem 100, restrictions to seamless integration of digital credentials for identity verification remain for each of the issuing authority 102, end user 104, and relying party 106. For instance, an issuing authority 102 and relying party 106 may be required to be versed on the latest iteration of standards to issue and accept, respectively, digital credentials. As may be appreciated, such standards may differ based on the issuing authority 102 such that a relying party 106 may need an expansive knowledge of such standards to ensure interoperability with each potential standard. Moreover, an end user 104 may be required to have multiple applications or digital wallets that each contain different digital credentials. Maintaining and supporting such varied modalities of storage and sharing of a digital credential for identity continues to hamper widespread adoption and trustworthiness of such digital identities.

Digital credentials comprising digital identity documents may also be associated with biometric information of the human user to whom the digital identity document is issued. Example biometric information may include a user's facial features, fingerprint or palmprint, retinal pattern, or other unique biometric marker). In this regard, verification of a user's identity using a digital credential may include verification that the digital credential provided by a user is a validly issued credential (e.g., that the digital credential is not forged or has not been tampered with) and that the user presenting the digital credential matches the biometric information associated with the digital credential. In some examples, the biometric information of a digital credential may be presented for human verification of a match with the presenting user. For example, a photo of the user's face may be presented to a human user for verification of a match between the photo and the user presenting the digital credential. In other contexts, biometric information stored as part of the digital credential may be digitally or algorithmically compared to biometric information provided during a transaction or interaction (e.g., via a photograph or fingerprint scan) to ensure a match.

Figure 2:
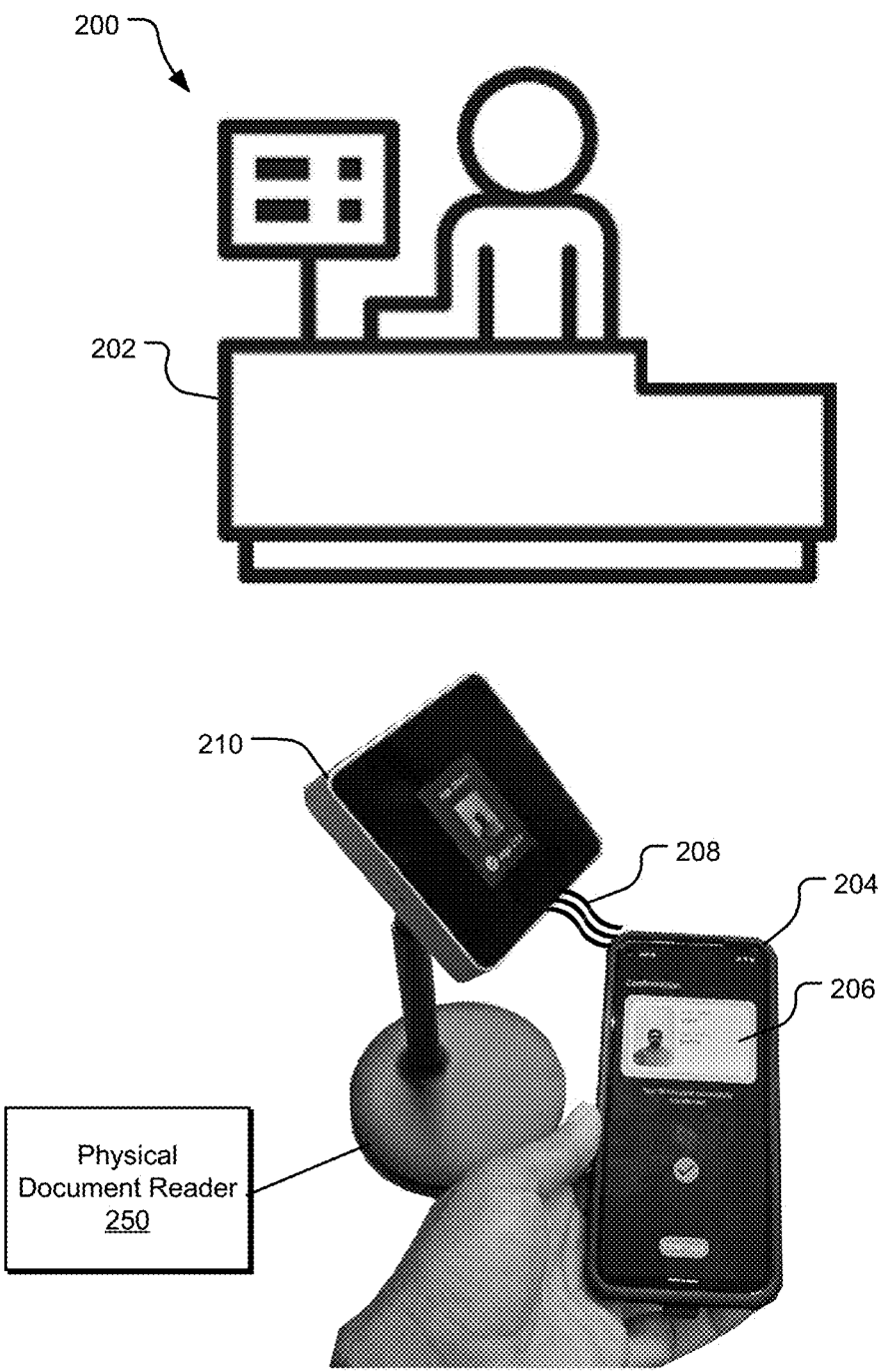
FIG. 2 is a schematic diagram illustrating a system that includes a verification platform for coordination and orchestration of digital identities.

FIG. 2 schematically depicts a user identification environment 200 that is agnostic to the type of digital credential offered for identity verification, as well as to requirements for local device compliance with current issuance and acceptance standards. In the environment 200 of FIG. 2, a generic point-of-service (POS) setting 202 is depicted in which identification of a user, often a customer, employee, or passenger of a common carrier, might be required for presentation to a relying party, i.e., the person operating the POS setting 202. Example POS settings 202 may include liquor or grocery stores requiring identification for proof of age for liquor purchases, bars and restaurants with similar proof of age needs, access or entry to event venues, airport concourse access for flights (e.g., Transportation Security Administration vetting), passing through customs at borders or airports, interactions with law enforcement officials, interactions with government agency officials (e.g., Social Security Administration, Veterans Administration, etc.), hospital admissions, employment or building access, and myriad other settings in which proof of identification to some degree is required to receive a product or service, gain access to a facility, or receive a benefit.

As discussed above, use of digital identities in such POS settings 202 is increasing, and reducing friction during such identification verification experiences is desirable. In the example environment 200 of FIG. 2, a user needing to prove an identity in the POS setting 202 presents a user device 204, e.g., a smart phone, which stores one or more digital credentials comprising digital identity documents 206 thereon. Examples of digital identity documents 206 may include mDLs, ePassports, employee IDs, and other VCs. Such digital identity documents 206 may be managed by a software application on the user device 204, may conform to digital identity standards, may be uniquely associated with biometric information regarding the user, and may further be encrypted to prevent alteration or forgery. As indicated in FIG. 2, the user device 204 may be leveraged to present an appropriate digital identity document 206 to an identity verification device 210 in the POS setting 202 to receive the desired good, service, or benefit, or conform to a reasonable request for identification from law enforcement or other authority. The user's digital identity document 206 stored on the user device 204 may be provided to the identity verification device 210 via a wireless communication transmission 208 as indicated in FIG. 2.

The identity verification device 210 may be agnostic to the type of user device 204 presented, the type of digital identity document 206 stored thereon, or the issuing authority (e.g., government entity, employer, etc.,) as long as the digital identity document 206 conforms to known standards, e.g., a public encryption key from an issuing authority corresponding to the private encryption key associated with the encrypted digital identity document 206 is available. The identity verification device 210 disclosed may interrogate the digital identity document 206 to perform verification locally using a verification endpoint installed at the identity verification device 210. Alternatively, the identity verification device 210 may act as a conduit to transfer the encrypted digital identity document 206 to a remote verification endpoint such as an Intermediary credential service platform. Regardless of whether verification is performed locally or remotely, the verification endpoint unlocks the digital identity document 206, performs a verification operation, and returns only the information needed for verification to the relying party at the POS setting 202. As described further below, a verification endpoint may comprise a standards abstraction layer and verification engine that provide digitally secure verification of the digital credential provided.

For example, in a context in which a liquor store or bar employee is the relying party needing to know whether they can sell or serve alcohol to the human user presenting the digital identity document, the information returned to the identity verification device 210 after verification may simply be a facial image of the human user associated with the digital identity document 206 and a confirmation that the human user is over the age of 21. The relying party may then compare the facial image with the face of the human user presenting the user device 204 standing in front of the relying party to determine whether there is a match and whether the purchase or service is legal. No other personally identifiable information is needed for the transaction or service, and the verification endpoint does not output any additional information to the identity verification device 210 other than what is needed by the relying party.

In alternative situations, additional information might be required by the relying party. For example, a clerk at a Social Security office may need to verify the name and social security number of the user presenting the digital identity document 206 on a user device 204. In such a scenario, a management application operating on the identity verification device 210 may be provisioned at a time of set-up and onboarding with the intermediary credential service platform to request such information and, due to the nature of the relying party, be authorized to receive such information from the digital identity document 206 of the user in addition to be verified as valid with respect to an issuing authority. In this scenario, if the digital credentials of the user are verified, the identity verification device 210 may receive and present a facial image, a name, and the social security number of the user for identity confirmation by the clerk and for use in accessing user records, but no further personal identifying information is returned as it is not required.

In some examples, the environment 200 may comprise a hybrid environment in which either or both digital credentials and physical credentials may be used for identity verification. In this regard, a physical document reader 250 may be provided in operative communication with the identity verification device 210. Thus, the physical document reader 250 may be used as an alternative when physical identification documents are utilized for identity verification. That is, identity information may be obtained from a physical credential read by the physical document reader 250. This may be presented locally at the POS setting 202 or may be communicated to a verification platform locally at the identity verification device 210 or located remotely from the identity verification device 210. In some instances, the physical identification document may be used with a digital identity.

The physical document reader 250 may be integrated with the identity verification device 210 or may be modularly provided for integration with the identity verification device 210. For example, the physical document reader 250 may have connectors with corresponding connections at the identity verification device 210 such that modular integration of the physical document reader 250 and identity verification device 210 may be provided to establish communication between the identity verification device 210 and the physical document reader 250. Different physical configurations of the physical document reader 250 and/or identity verification device 210 may be provided for different POS settings 202.

Figure 3:
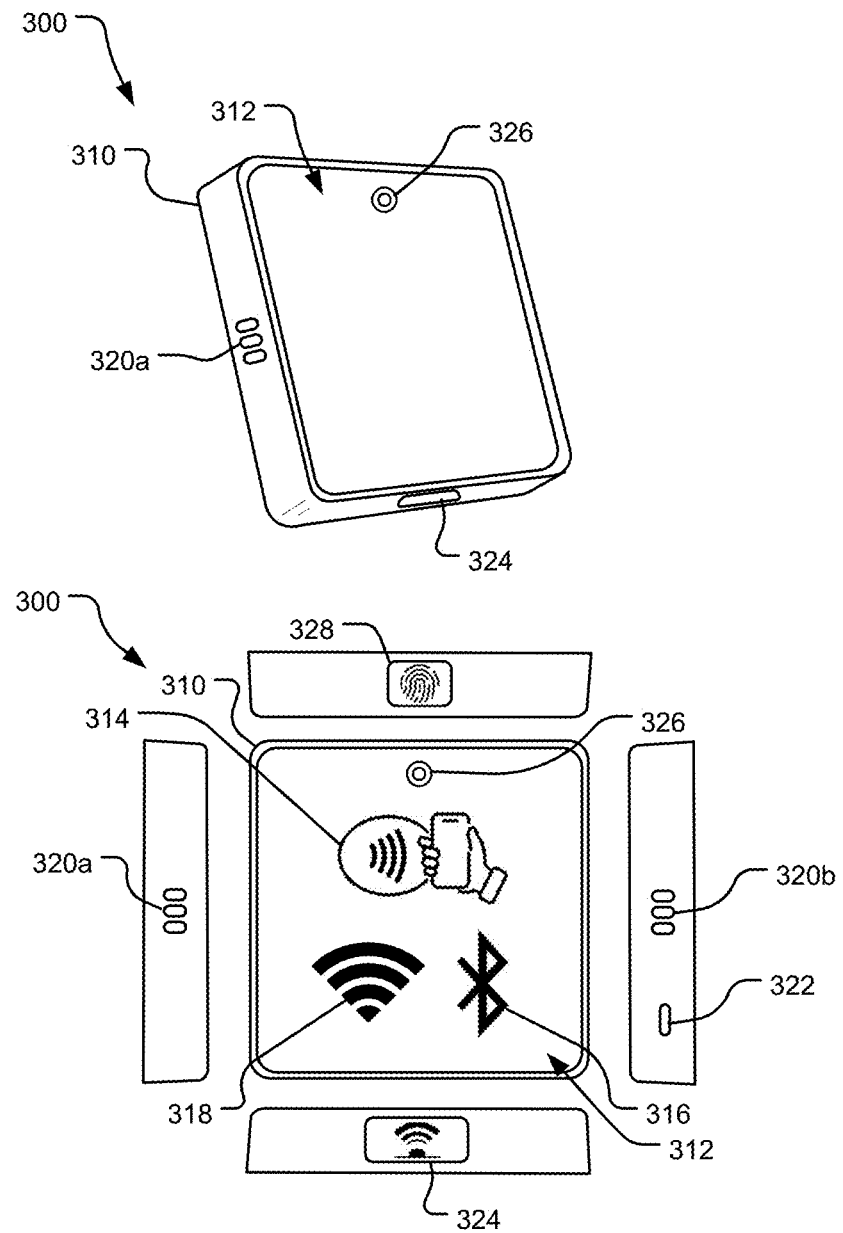
FIG. 3 is a schematic illustration of an example point-of service verification device.

An example configuration of an identity verification device 300 is presented in FIG. 3 in a collection of views, first in an isometric view and then in a top plan view below with each of the side elevation views of the identity verification device 300 surrounding the top plan view. The identity verification device 300 may be an electronic device with operational components such as a processor, memory, communication transceivers, a power supply or transformer, a circuit board, and other components encapsulated within a small housing 310. For example, the housing 310 of the identity verification device 300 may be of a size and form factor similar to that of a smart phone or mini tablet computer. The memory may store an operational software program, a configuration software program, and firmware for control of the various included hardware components, all of which may be instantiated by the processor. In some implementations, the identity verification device 300 may function as a verification endpoint and the operational software program may provide such additional functionality and the memory may further include a database or library of standards and protocols corresponding to numerous issuing authorities for accepting digital credentials issued thereby. In some implementations, a cryptographic security chip (e.g., a Secure Access Module (SAM), a Trusted Platform Module (TPM) or Hardware Security Module (HSM)) may be included for storage and management of cryptographic and other security keys. If the verification device 300 includes software and data to function as a verification endpoint, the verification device 300 can function offline as a standalone unit for credential verification purposes.

The top surface of the identity verification device 300 may be a video display screen 312 (e.g., a liquid crystal (LC) display or a light emitting diode (LED) display) used to provide any of the following example functions or services: direction to users during the verification process; an image of the holder of the digital identity document to the relying party to confirm the identity of the user requesting the good, service, or benefit; verification of needed identifying information; a provisioning interface during set-up; and other functions that may be aided by visual presentation capability. In some implementations, the display screen 312 may be a touch screen display allowing for receipt of tactile input from a user.

As indicated above, the identity verification device 300 may include one or more communication transceivers. For example, a near-field communication (NFC) chip 314 (represented by an icon on the display screen 312) conforming to various external control protocols of user devices (e.g., smart phones) may be included to initiate an identity verification session and operate in conjunction with the security chip to ensure a secure data exchange. Additionally, a Bluetooth® transceiver chip 316 (represented by an icon on the display screen 312) may be included to provide more significant, short-range data transfer between the identity verification device 300 and a user device. The Bluetooth® transceiver chip 316 may be a dual mode chip supporting both "classic" and Bluetooth Low Energy protocols. The Bluetooth® transceiver chip 316 may further be used to provide wireless peripheral interfaces with the identity verification device 300, e.g., with a keyboard or mouse during a provisioning or updating session.

Further, a Wi-Fi® transceiver chip 318 (represented by an icon on the display screen 312) may be included for connection with a communication network to provide data transfer between the identity verification device 300 and a remote intermediary credential service platform. For example, the Wi-Fi® transceiver chip 318 may connect to a local area network (LAN) at the POS setting that includes a gateway device that connects the POS setting to a wide area network, such as the Internet, to ultimately communicate with the intermediary credential service platform. Data transfer between the identity verification device 300 and the intermediary credential service platform can include identity verification requests and responses, remote management for provisioning and configuration of software and firmware, downloads of software and firmware updates (e.g., to maintain compliance with ISO-18013-5, W3C VC, or Digital Travel Credential), receipt of security certificates and public keys from issuing authorities, transaction analytics data, diagnostic data, verification audit logs, etc. In some implementations, the Wi-Fi® transceiver chip 318 may be configured as a Wi-Fi® Aware chip with the ability to continuously discover other devices within Wi-Fi® range to quickly provide association alternatives and connections and secure exchange of data.

In other example embodiments, the identity verification device 300 may be physically connected to the LAN, e.g., via an Ethernet port and corresponding cable. In other example embodiments, the identity verification device 300 may alternatively or additionally include a wireless telephony transceiver for connection with data channels in a wireless telephone network for remote communication. In yet another example, the identity verification device 300 may alternately include a telephony port and modem for physical connection to and data transfer over a plain old telephone service (POTS) network.

The identity verification device 300 may also be equipped with one or more loudspeakers 320*a/b* to provide audible responses, confirmation, or information. Audible signals and messages can reinforce the visual cues and verification information provided on the display screen 312. In another example, the loudspeakers 320*a/b* may provide directions or information to users and relying parties who are visually impaired. The identity verification device 300 may further be equipped with one or more data communication ports 322, for example, a universal serial bus (USB) port of one or more types (e.g., micro, mini, A, B, C, etc.) or other communication port types (e.g., Lightning). The data communication port 322 may be used to connect the identity verification device 300 directly to a local desktop or laptop computer, for example, for direct management or maintenance of the identity verification device 300. Additionally, the data communicating port 322 may be used to establish communication with a physical identification scanner as noted above for use in hybrid physical/digital environments. In the example implementation shown in FIG. 3, the data communication port 322 is presented as a USB-C port, which allows the port to also function as an electrical charging connector for the identity verification device 300. However, a separate and dedicated electrical charging port may be provided in alternative implementations of the identity verification device 300.

The identity verification device 300 may further include a sensor imager 324, e.g., an infrared image reader ("barcode scanner"), for scanning one- and two-dimensional image codes, for example, standard, one-dimensional bar codes, two-dimensional hybrid bar codes according to the PDF417 standard (a high-density symbology capable of encoding text, numbers, files and actual data bytes), and two-dimensional, quick response (QR) codes. Such one- and two-dimensional image codes may be presented by a user device on a display screen for ingestion by the sensor imager 324 to provide handshake information, encryption key information, or a uniform resource locator (URL) to access the issuing authority over the Internet for information needed to validate the digital credential on the user device. Such one- and two-dimensional image codes may be presented by a user's physical identity document. One- and two-dimensional image codes may be used in lieu of or in conjunction with wireless data transfer over transceivers using near field transmission protocols.

The identity verification device 300 may additionally include one or more biometric information sensors, which may be used as part of the identity verification process, e.g., to confirm that the human user presenting the digital identity document or credential is, in fact, the human associated with the digital credential. Electronic capture of biometric information may be used, for example, instead of depending upon the relying party to conduct a visual comparison of the human user presenting the digital identity credential to a photographic image associated with the digital credential. In one implementation, the biometric information sensor may be a camera 326 which may take a photograph of the person presenting the digital credential to the identity verification device 300. In another implementation, the biometric information sensor may be a fingerprint reader 328 which may intake a digital imprint of the fingerprint of the human user presenting the digital credential to the identity verification device 300. The biometric information (facial image, fingerprint, or both) captured by the identity verification device 300 may be transferred to the verification endpoint, either locally on the identity verification device 300 or remotely to an intermediary credential service platform along with the digital identity document received from the user device, which may contain encrypted images of the human user's face or fingerprint for comparison by biometric authentication algorithms operating on the verification endpoint to provide further assurance of the validity of the human user and the digital credentials.

The verification endpoint may coordinate the validation and verification of digital identity documents and credentials issued by a plurality of issuing authorities, thereby allowing the identity verification device 300 in a POS setting to be agnostic to the type of digital identity document or issuing authority. For example, for a relying party with a need to verify all U.S. state-issued driver's licenses, the relying party would be tasked with integrating and maintaining potentially 50 or more different issuing authority credentialing standards. This could include initial workflow integration and maintaining updates for any issuing authority credentialing standards. In contrast, by utilizing the verification platform, the platform assumes the tasks of integration and maintenance of the issuing authority credentialing standards from any issuing authority supported by the platform. As such, the burden on the relying party and the memory and processing requirements for the identity verification device 300 at a POS setting, as well as associated monetary costs, are greatly reduced. The platform may manage interfacing with the issuing authorities, collecting and organizing credential standards, protocols, and public keys, and maintaining currency thereof, and then merely provide the data to the verification endpoint.

As long as the presentation of the digital identity document conforms to one or more identity standards, the identity verification device 300 can receive the digital identity document or other digital credential locally from a user device and pass the credential information to the verification endpoint for verification services. The verification endpoint may maintain a current database of identity credentialing protocols and standards from any number of issuing authorities received from the platform to thereby manage verification services for most any type of digital identity document received at an identity verification device 300 associated with the larger verification system. With this configuration, large numbers of identity verification devices 300 deployed at different POS settings need not each separately build, maintain, and regularly update a large database of credentialing information. Rather, the platform provides this service and can be configured on Internet-accessible computer server platforms (e.g., cloud computing services) to manage thousands of different verification requests simultaneously and provide the information to verification endpoints. Identity verification devices 300 with verification endpoints built in can receive regular updates from the platform. Alternatively, identification verification devices 300 can access an intermediary credential services platform with a verification endpoint for remote validation of digital credentials.

The various issuing authorities may provide, publish, and/or otherwise make available to a verification endpoint respective issuing authority credentialing standards associated with a user digital identity provided by the issuing authority to an end user. The issuing authority credentialing standard may define the manner in which the digital identity provided from the issuing authority to the end user is to be validated. In some examples, this may include cryptographic keys (e.g., public keys) used in verification of the digital identity, a uniform resource identifier (URI) that provides a pointer to an authority for proof of validity, a public or private ledger, or any other appropriate cryptographically secure standard defined by the issuing authority for verification of an authentic digital identity provided by the issuing authority. Such issuing authority credentialing standard may also define appropriate biometric requirements to be satisfied for verification. The issuing authority credentialing standard for any issuing authority may be periodically updated to, for example, provide new credentialing standards or updated verification information. The intermediary credential service platform may generate an outcome of the verification operation and communicated such to the identity verification device of the relying party. In turn, the relying party may take an appropriate action based on the verification outcome, which may include verification of the identity or a portion of the identity of the end user.

For example, the outcome of the verification operation may include the identity of the end user including the name and/or other information of the end user. However, in some contexts, limited information from the digital identity information may be used in the verification operation. For example, for an end user entering into an age-restricted transaction with the relying party, the digital identity information provided by the digital identity document of the end user may include additional information beyond the age of the user (e.g., the name, gender, address, social security number, or other sensitive information). The issuing authority may not wish to share this additional information with the relying party and the relying party may have no use or need to access this additional information. Alternatively, the request provided by the relying party to the intermediary credential service platform may define the necessary information sought (e.g., the current age of the user or merely whether the user exceeds some age threshold without providing the exact age of the user). Accordingly, the intermediary credential service platform may perform a validation operation and the outcome may be limited to providing verification of the information sought without providing additional details that may be available from the digital identity document provided by the end user.

Figure 4:
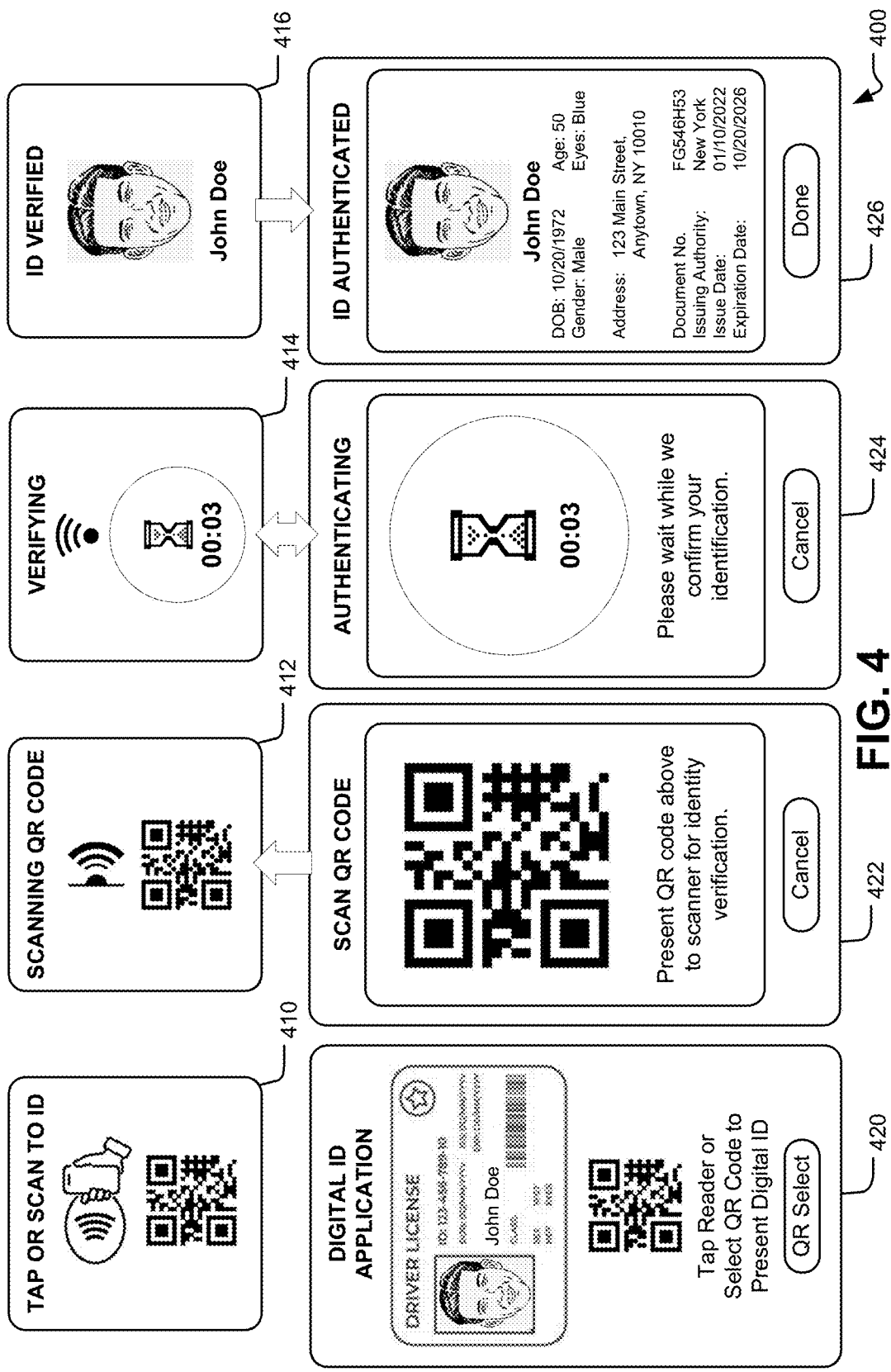
FIG. 4 is a schematic diagram illustrating an example digital identity verification interaction with a point-of-service verification device.

A first example of an identity verification scenario utilizing the identity verification device in a POS setting for proving identity, e.g., for airport concourse access, is depicted in FIG. 4. In this example, the identity verification device, e.g., positioned at a TSA screening desk, is ready for an interaction in a passive configuration, as indicated in illustration 410, waiting for initiation of a digital identity verification request. The display screen of the identity verification device may present options for interaction between a user device and the identity verification device, e.g., instantiation using an NFC "tap" or by presentation of a QR code for scanning. A user of a user device, such as a smart phone, who wants to use a digital identity document for authentication to complete a transaction or interaction in a POS setting may access an application on the user device that stores and manages digital identity documents as indicated in Illustration 420. The application may present multiple digital identification documents for selection and use depending upon the circumstance.

In this configuration, the user is provided the option of NFC interaction or providing a QR code for scanning. For the purposes of this example, the user selects use of the QR code as indicated in illustration 422. Alternatively, the particular credential selected by the user or necessary for the transaction may require the credentialing transaction to access an Internet platform of the issuing authority to provide the credential validation remotely. The application on the user device may then render a QR code image on a display screen that is encoded with the URL of the issuing authority. As indicated in illustration 412, when the QR code displayed on the user device is placed in front of the sensor imager on the identity verification device, the sensor imager scans the QR code to determine the URL of the issuing authority Internet site and the identity verification device connects to the issuing authority internet site for completion of the credential verification process. Simultaneously, a secure communication connection may be created between the user device and the identity verification device, e.g., via Bluetooth® discovery and connection.

When a secure connection between the identity verification device and the user device is established, as indicated in illustrations 414, 424, additional data including a digital identification document or credential may be transmitted between the identity verification device and the user device, e.g., via Bluetooth® transmission, and further from the identity verification device and the issuing authority Internet site, or alternatively, to the intermediary credential service platform, e.g., via Wi-Fi® transmission with a request for verification. The identification verification device may also send an indication of the type and scope of verification needed to issuing authority site or the intermediary credential service platform. While waiting for verification to be completed, each of the identity verification device and the user device may remain communicatively linked and display a status indicator during the verification process. It may be appreciated that the user may be provided control over the transaction with an ability to cancel the digital identification verification request at any point during the process as indicated by the "Cancel" button on the touch screen display of the user device in illustrations 422, 424.

When authentication of the user credentials and verification of the identity of the user is received, as indicated in illustrations 416 and 426, two different results may be displayed on each of the identity verification device and the user device. For example, the TSA agent or other relying party agent may only need an image of the face associated with the digital identification credential to compare to the human user with the user device seeking airport access and a name to compare and confirm with the name printed on a boarding pass. No other personally identifiable information is needed to complete the screening process. Therefore, the identity verification device presents only the verified passenger name and photo for confirmation as indicated in illustration 416. As noted above, in some implementations, the identity verification device could be configured to take a picture of the passenger for biometric comparison to a facial image stored with the digital identity document presented and the verification endpoint could further verify the identity of the user. This additional step could be helpful in instances where a person has changed a hairstyle, grown a beard, or otherwise has a changed appearance that might make it difficult for a relying party agent to confirm the human user waiting before them corresponds to the image associated with the digital identity document.

In contrast to the limited information provided to the identity verification device for consumption by the relying party, the user device may present additional identity information to allow the user to periodically check and confirm that the information associated with the digital identity document is correct or current as indicated in illustration 426. Additionally, if for some reason additional information is needed to complete a transaction or receive approval, such information is available to show the relying party. When the interchange is complete, the communication connection between the identity verification device and the user device is disconnected and the user can close the application on the user device. The information presented to on the identity verification device to the relying party is not saved, but rather erased once the transaction or interchange is complete. The identity verification device may keep a hashed log of the transaction or exchange for audit purposes as further described below. Similarly, the application on the user device may maintain such a log of instances a digital identity document was used, e.g., including identification of the relying party, date, time, etc., for example, for purposes of tracing identity theft, however unlikely.

Figure 5:
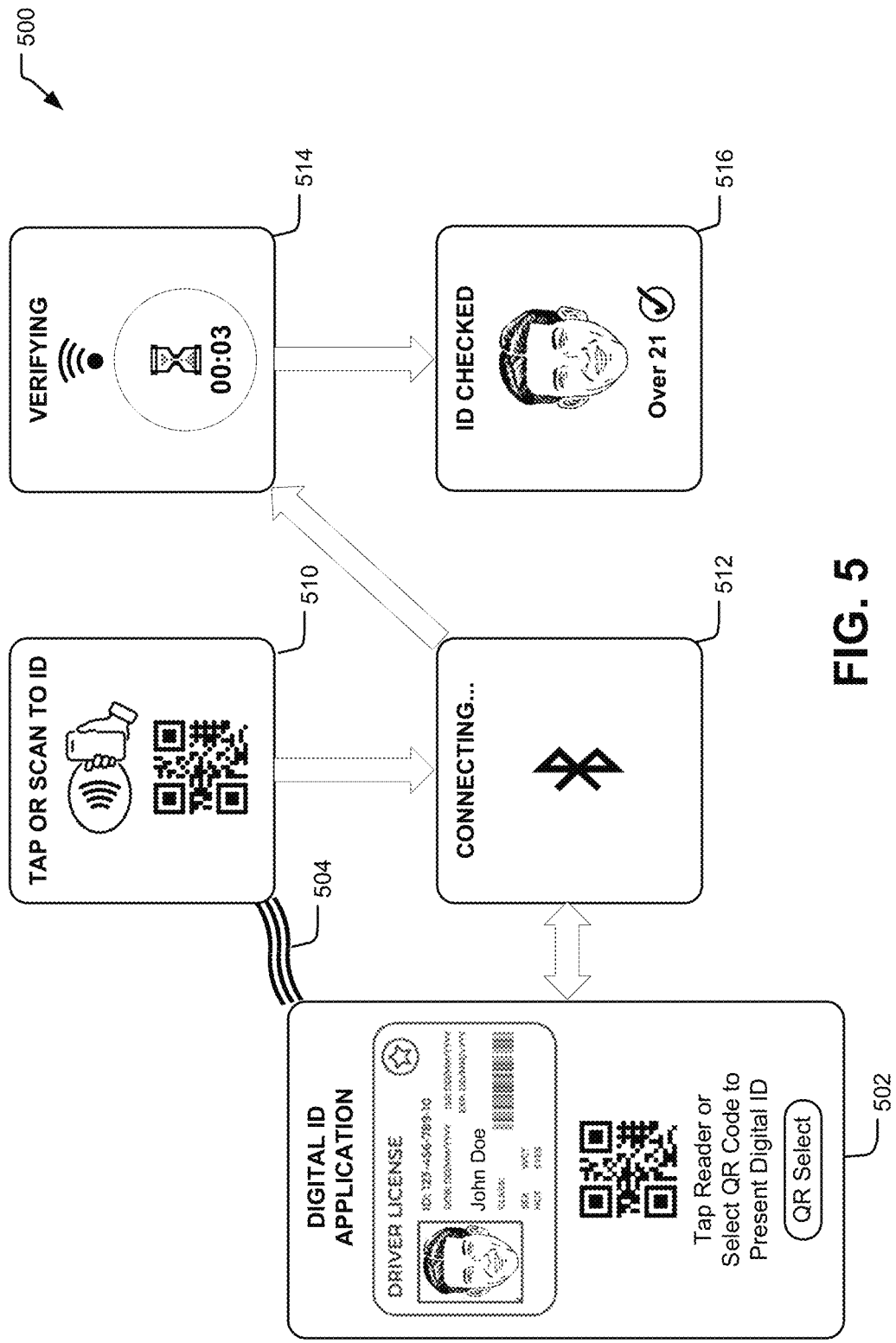
FIG. 5 is a schematic diagram illustrating another example digital identity verification interaction with a point-of-service verification device.

A second example of an identity verification scenario is depicted in FIG. 5 and utilizes the identity verification device in a POS setting for an age restricted purchase or service. In this example, the identity verification device is ready for an interaction in a passive configuration, as indicated in illustration 510, waiting for initiation of a digital credential verification request. The display screen of the identity verification device may present options for interaction between a user device and the identity verification device, e.g., instantiation using an NFC "tap" or by presentation of a QR code for scanning. A user of a user device, such as a smart phone, who wants to use a digital identity document for authentication to complete a transaction or interaction in a POS setting may access an application on the user device that stores and manages digital identity documents as indicated in Illustration 502. The application may present multiple digital identification documents for selection and use depending upon the circumstance.

In this configuration, the user is again provided the option of NFC interaction or providing a QR code for scanning. For the purposes of this example, the user decides to "tap" the identity verification device with the user device as indicated by the wireless communication connection 504 between illustration 502 and illustration 510. As indicated in illustration 512, when the NFC connection completes a secure handshake, communication can switch to Bluetooth® transmissions to provide greater bandwidth for information transfer. As indicated in illustration 514, additional data including a digital identification document or credential and private encryption key may be transmitted from the user device to the identity verification device. If the identity verification device does not also include a verification endpoint, the additional data may be further transmitted from the identity verification device and to the intermediary credential service platform, e.g., via Wi-Fi® transmission, with a request for verification. The identification verification device may also send an indication of the type and scope of verification needed to the intermediary credential service platform. While waiting for verification to be completed by the verification endpoint, the identity verification device may display a status indicator during the verification process. In this implementation, the application on the user device does not provide further information to the user and all status information is presented only on the identity verification device.

When authentication of the user credentials and verification of the identity of the user is received by the identity verification device, the relying party agent may need only an image of the user's face associated with the digital credential to compare to the human user presenting the user device seeking an age-restricted product or service and a confirmation that the age of the user is above the threshold age. No other personally identifiable information is needed to complete the verification process, e.g., including the birthdate of the user. Therefore, the identity verification device presents only the photo for comparison and confirmation (or denial) of adequate age, as indicated in illustration 516.

Figure 6:
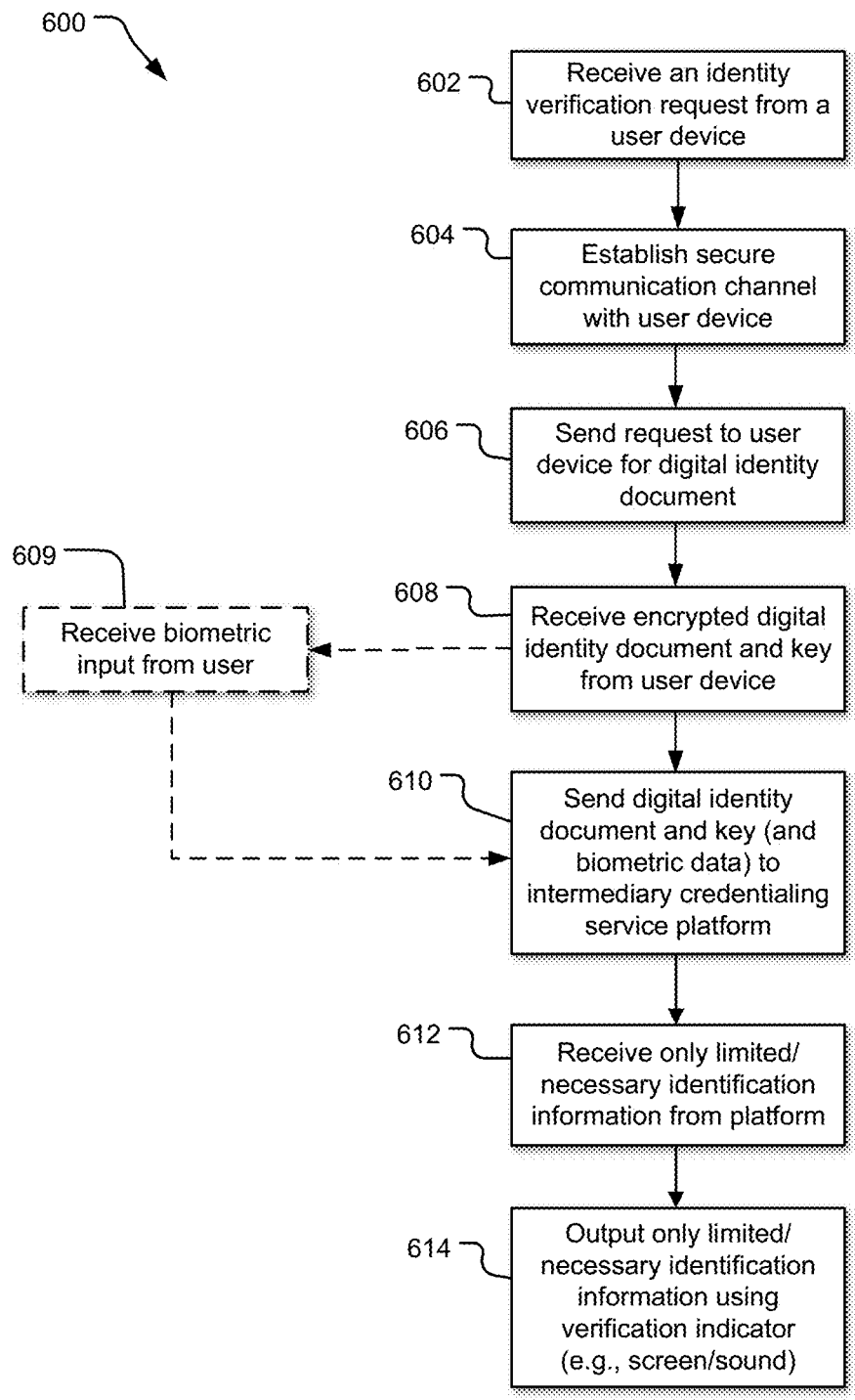
FIG. 6 is a flow diagram illustrating an example process for digital identity verification interaction with a point-of-service verification device.

With further reference to FIG. 6, an example generalized process flow 600 related to digital identity verification by the identity verification device managed by a relying party is shown. The example process flow 600 of FIG. 6 is intended to cover the example verification processes conducted by the identity verification devices of FIGS. 4 and 5, as well as other variations with regard to circumstance and identification information unlocked and provided to the relying party. In a receiving operation 602, the identity verification device receives a request from a user device for identification verification to complete a transaction, receive a service or benefit, gain restricted access, or otherwise fulfill a need to establish a verified identity. As described above, two exemplary methods for receipt of such a request may be via an NFC "tap" on the identity verification device or presentation of an image code (e.g., a QR code) at a sensor imager on the identity verification device. Upon receiving the user request, the identity verification device may establish a secure communication channel with the user device as indicated in establishing operation 604. The communication channel will typically be made using a wireless transmission protocol, e.g., NFC, Bluetooth®, or Wi-Fi®.

Once the secure communication channel is established, the identity verification device may request the user device share a digital identity document or digital credential for verification as indicated in requesting operation 606. The identity verification device may then receive the encrypted digital identity document from the user device, as well as a cryptographic private key to be used to unlock the digital identity document as indicated in receiving operation 608. In addition, as an alternate or optional step, the identity verification device may receive biometric information, e.g., a facial photograph through a camera or a fingerprint through a fingerprint scanner included in the identity verification device as indicated in optional receiving operation 609. The identity verification device may then send the digital identity document and the private encryption key, and any biometric data received as required by a particular credential protocol to a verification endpoint, e.g., either a local software module or to a remote intermediary credentialing service platform as indicated in sending operation 610.

Once the verification endpoint completes the verification process, the identity verification device receives a response from the verification endpoint containing only the limited or necessary identification information required to verify the user for the particular activity at the point of service setting. For example, as discussed above, only an image and verification that the user is above an age threshold are necessary for verification by a relying party for an alcohol purchase. Similarly, only an image and a name may be necessary for use by the relying party at a security checkpoint. Alternatively, a name, an image, and a social security number may be necessarily received by a relying party at a Social Security office to provide services. Even more information, such as a residential address, may be required by a bank to process a loan application.

Once the necessary identification or confirmation information is received, the identity verification device may output the information in a tangible form using a verification indicator for use by the relying party as indicated in outputting operation 614. For example, in some instances the verification indicator may be a presentation of information (e.g., picture and/or data) on a video display screen. In other instances, the verification indicator could be an audible signal or statement that the user identity is verified. In yet another scenario, the verification indicator could be merely a green light indicating approval or verification or a red light indicating that the verification failed.

In even further example implementations, the identity verification device can leverage issuing party information and an internet connection to perform additional "look up services", for example, access a car rental agreement, hotel reservation, or event ticket. The identity verification device may then be leveraged by the issuing authority to provide additional information or user guidance, for example, "your rental car is ready at stall 34," "room 1112 is ready for you," or "please proceed to seat number D100." In each of these example scenarios, the identity verification device could provide this information to the user or it could transfer the information to the user device for presentation to the user by the user device. As a further example, the identity verification device could transfer access credentials to the user device once the user credentials are verified, such as an electronic room key or an event ticket.

As noted above, a verification operation initiated at an identity verification device may be performed by a verification endpoint. The verification endpoint may be provided locally at the identification verification device or may be remotely located at an intermediary credentialing platform. In other examples, a verification endpoint may be provided at a verification platform for use in verifying remote transactions (e.g., online transactions) between an end user and a relying party.

Figure 7:
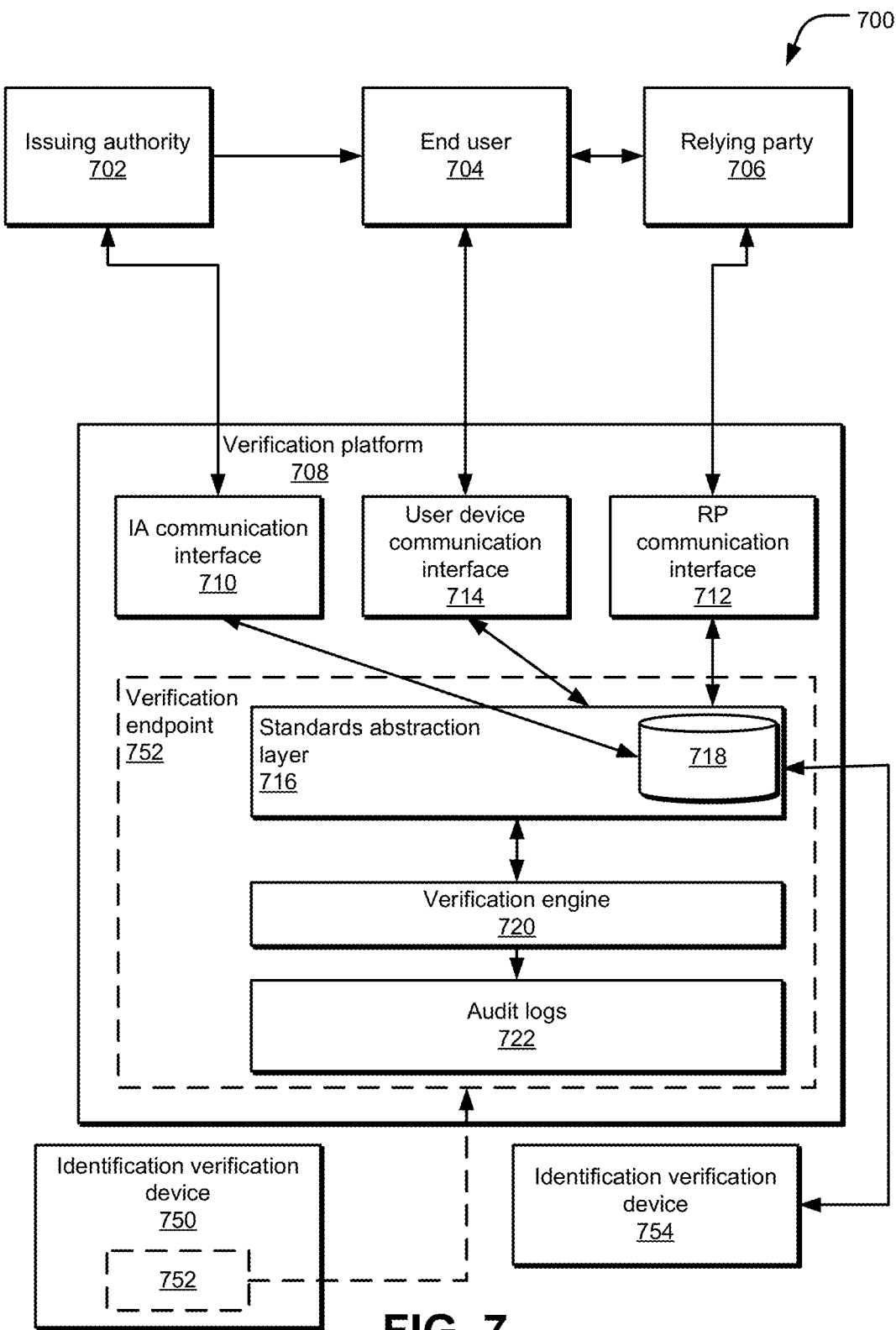
FIG. 7 illustrates a system that includes a verification platform for coordination and orchestration of digital identities.

In turn, FIG. 7 depicts a system 700 that illustrates various examples of verification endpoints for use in verification operations according to the foregoing description using an identity verification device or in remote transactions. In the later regard, the system 700 may include a verification platform 708 comprising a verification endpoint 752 for coordination and orchestration of verification of digital credentials for verifying an identity of an end user 704. The verification platform 708 of the system 700 may provide an interface to allow for identity verification using digital credentials in remote or off-premise (e.g., online) transactions. In this regard, the verification platform 708 may be utilized in performing verification operations for online transactions in which a relying party 706 and end user 704 are interacting via online transactions The verification endpoint 752 of the verification platform 708 may include a standards abstraction layer 716 comprising a digital identity credentialing database 718. The verification platform 708 includes an issuing authority communication interface 710 in operative communication with an issuing authority 702. While shown as a single issuing authority 702, it may be appreciated that the verification platform 708 may be in operative communication with a plurality of different issuing authority 702, such that illustration of the issuing authority 702 is for illustration purposes only. In any regard, the issuing authority communication interface 710 may facilitate the receipt of an issuing authority credentialing standard at the digital identity credentialing database 718. In an example, the issuing authority 702 may provide the verification platform 708 with an issuing authority credentialing standard associated with a user digital identity provided by the issuing authority 702 to an end user 704 (e.g., the issuing authority 702 may push the issuing authority credentialing standard to the digital identity credentialing database 718). In other contexts, the issuing authority communication interface 710 may obtain access to a published issuing authority credentials standard to retrieve the issuing authority credentialing standard for storage in the digital identity credentialing database 718 (e.g., the issuing authority communication interface 710 may pull the issuing authority credentialing standard from the issuing authority 702). In other contexts, different approaches to storing the issuing authority credentialing standard may be provided such that the issuing authority credentialing standard is stored in the digital identity credentialing database 718.

In any regard, the issuing authority credentialing standard may define the manner in which the digital identity provided from the issuing authority 702 to the end user 704 is to be validated. That is, the issuing authority credentialing standard may provide the cryptographic approach used to validate a cryptographically secure digital credential and/or may define biometric standards for use in a verification operation. Examples of an issuing authority credentialing standard may include cryptographic keys (e.g., public keys) used in verification of the digital identity or any other appropriate standard defined by the issuing authority 702 for verification of an authentic digital identity provided by the issuing authority 702. Any other approach such as those described above may be provided in addition to or as an alternative to public keys such as use of a URI for providing a pointer to remote verification resources. An issuing authority credentialing standard may also define appropriate biometric requirements to be satisfied for verification.

In any regard, the issuing authority credentialing standard may be stored in a digital identity credentialing database 718 of the standards abstraction layer 716, along with any other issuing authority credentialing standard provided by any other issuing authority 702. In this regard, the standards abstraction layer 716 may provide a repository for a plurality of different issuing authorities 702 such that the verification platform 708 may be operative to verify any appropriate digital identity issued by any issuing authority 702 that has provided an issuing authority credentialing standard. Moreover, the issuing authority credentialing standard for any issuing authority 702 may be periodically updated to, for example, provide new credentialing standards or updated verification information.

In addition, the standards abstraction layer 716 may provide for orchestration of a verification operation based on the issuing authority credentialing standard for a given transaction. For instance, the issuing authority credentialing standard may define the necessary information to be collected for use in a verification operation. The standards abstraction layer 716 may coordinate the exchange of such information via a user device communication interface 714 and/or a relying party communication interface 712. This may include determining requested information by the relying party 706 (e.g., verification of user age, user name, or other information needed for the particular transaction at the relying party 706), coordination of consent to share the requested information by the end user 704, exchange of digital credential information with the end user 704 (e.g., in a manner that is agnostic to the particular form, application, or other implementation of the digital credential), or other orchestration needed to determine, obtain, and provide the necessary information needed for a given verification operation.

For example, the end user 704 may interact with a relying party 706 in a transaction in which the relying party 706 wishes to verify the identity of the end user 704 as a given human user. In this regard, the relying party 706 may provide a request for verification to the verification platform 708. Specifically, the relying party 706 may be in operative communication with the verification platform 708 via the relying party communication interface 712. In turn, the standards abstraction layer 716 may coordinate with a user device communication interface 714 to solicit digital identity information from the end user 704 in connection with verification orchestration as described above. Such digital credential information may be selected by the end user 704 and provided to the verification platform 708 via the user device communication interface 714. In turn, the user device communication interface 714 may provide the digital identity information to the standards abstraction layer 716.

The standards abstraction layer 716 may provide the digital credential information received from the user device communication interface 714 along with the issuing authority credentialing standard, biometric information, and/or any other information orchestrated by the standards abstraction layer 716 for a verification operation to a verification engine 720 for secure processing of the information. In this regard, the verification engine 720 may use an issuing authority credentialing standard in relation to the digital credential and biometric information obtained by the standards abstraction layer 716 to perform a verification operation.

That is, the verification engine 720 may apply the issuing authority credentialing standard to the proffered digital credential to verify the identity of the end user 704. As noted above, this may include verification of the validity, authenticity, and originality of the digital credential provided as well as potential matching of biometric information from the end user 704 with biometric information contained in the digital credential. Accordingly, the verification engine 720 may comprise hardware, software, and/or firmware adapted to perform secure computing (e.g., using a TPM, HSM, or other secure processor). In any regard, the verification engine 720 may generate an outcome of the verification operation, which may be communicated to the relying party 706 via the standards abstraction layer 716 and relying party communication interface 712. In turn, the relying party 706 may take an appropriate action based on the outcome, which may include verification of the identity or a portion of the identity of the end user 704.

For example, the outcome of the verification operation may include the identity of the end user 704 including the name and/or other information of the end user 704. However, in some contexts, limited information from the digital identity information may be used in the verification. For instance, assume the end user 704 is entering into an age-restricted transaction with the relying party 706. In this regard, the digital identity information provided to the verification engine 720 by the end user 704 may include additional information beyond the age of the issuing authority 702 (e.g., the name, gender, address, social security number, or other sensitive information). The issuing authority 702 may not wish to share this additional information with the relying party 706 and the relying party 706 may have no use or need to access this additional information. In turn, the request provided by the relying party 706 to the verification engine 720 may define the necessary information sought (e.g., the current age of the issuing authority 702 or even if the issuing authority 702 exceeds some age threshold without providing the exact age of the issuing authority 702). Accordingly, the verification engine 720 may perform a validation operation in relation to the information sought. As such, the outcome of the verification operation may be limited to providing verification of the information sought without providing additional details that may be available from the digital identity information provided by the end user 704. In addition, the verification engine 720 may coordinate with the end user 704 via the user device communication interface 714 to solicit approval of the verification of the information sought and the approval of the end user 704 to share the information sought with the relying party 706. Thus, the end user 704 may have control over the specific information used in the verifying operation and the identity of the relying party 706 with which the outcome of the verification operation is shared.

Also shown in FIG. 7 is an identification verification device 750 and an identity verification device 754. The identification verification device 750 provides an example of a local device at a POS setting or other location that may include a verification endpoint 752 (e.g., including a standards abstraction layer 716, digital identity credentialing database 718, and verification engine 720) for local or off-line verification of identity at the location of the identification verification device 750. In contrast, identity verification device 754 illustrates a local device at a POS setting that may coordinate with the verification endpoint 752 of the verification platform 708 to perform a remote verification operation. As such, either or both of the identification verification device 750 and identity verification device 754 may be deployed in the system 700 to provide device-based verification of identities in different contexts.

The system 700 may provide a number of distinct advantages in coordinating the relationships (e.g., such as those shown in the ecosystem 100 of FIG. 1). For example, the system 700 may allow an end user 704 to utilize any repository for digital identity. Oftentimes, digital identities are stored and accessible via a wallet application on a computing device secured by the end user 704. However, not all digital identities are portable to every digital wallet environment. As such, the system 700 may be flexibly used with any wallet or other digital repository of a digital identity.

In addition, the system 700 may relieve the relying party 706 from integration and/or maintaining a plurality of issuing authority credentialing standards. For instance, even in an example where the relying party 706 may wish to verify all state-issued driver's licenses from the various state jurisdictions across the United States, the relying party 706 may be tasked with integrating and maintaining potentially 50 or more different issuing authority credentialing standards. This may include initial workflow integration and maintaining updates for any issuing authority credentialing standards. In contrast, by utilizing the verification platform 708, the verification platform 708 may be tasked with integration and maintenance of the issuing authority credentialing standards from any issuing authority 702 supported by the verification platform 708. As such, the relying party 706 may streamline workflows by simply defining the verification request format to the verification platform 708 for various verifiable transactions that the relying party 706 performs.

Further still, the verification platform 708 may maintain audit logs 722 regarding verification operations performed. Such audit log 722 may provide compliance verification for end user 704 and/or relying party 706 utilizing the verification platform 708 as an intermediary for verification of digital identities. The audit log 722 may be presented and/or accessible in a number of different ways. For instance, each relying party 706 may have an associated dashboard that reflects verification operation outcomes associated with verification requests originating at each respective relying party 706. The audit log 722 may be accessible via a relying party validation log portal (e.g., with appropriate security and/or isolation of verification operation outcomes from the audit log 722 specific to the relying party 706 accessing the portal. In turn, the relying party 706 may access the audit log 722 to provide compliance reporting regarding identity verification of end users 704 verified by the verification platform 708 on behalf of the relying party 706. In addition, the audit log 722 may provide the relying party 706 analytics information regarding, for example, the number of end users 704 verified, the number of times a given end user 704 is verified, or other metrics provided in the audit log 722.

In addition, the end user 704 may have access to audit log 722 regarding verification operations performed using any digital identity of the end user 704. Such access may be provided via a user validation log portal, which may provide online access to the portal for access by the end user 704. This may provide the end user 704 a record of what relying party 706 had access to what portions of the digital identities of the end user 704 and the outcome of verification operations performed in relation to the end user 704.

The outcomes of verification operations may be stored in the audit log 722 as unique tokens. Each token may provide a unique, verifiable record of a verification operation, but may provide anonymization or other disassociation with a given digital credential used in the verification operation. As an example, for each verification operation, a token may be generated using demographic information (e.g., some information obtained from the digital credential used in the verification operation such as name, age, date of birth, address, or other information particular to the digital credential) and biometric information used in the verification operation (e.g., including stored biometric information associated with the digital credential or provided biometric information received from the end user 704). In any regard, generation of the token may create a unique, verifiable, non-reversible token regarding the verification operation. In addition, as noted above, the token may be disassociated from the digital credential provided such that the digital credential cannot be linked or otherwise associated with the token without access to the digital credential and/or biometric information used in token generation). In this regard, the token may be created using a cryptographic operation applied to the demographic information, biometric information, or other source data input for tokenization. As an example, the cryptographic operation applied may be a hashing function such as MD5, SHA-1, RIPEMD-160, Whirlpool, AES, SHA-2, SHA-3, BLAKE2, BLAKE3, or any other cryptographic algorithm. Accordingly, each token stored in the audit log 722 may provide a non-repudiable proof of a corresponding verification operation that is anonymized from the digital credential involved in the verification operation. As such, while a token may not provide any personally identifying information, the token may be verifiable by reproduction of the token reusing the input information (e.g., assuming the end user 704 authorizes use of the digital credential for such verification purposes). Furthermore, while such tokens are non-reversible and anonymized, the tokens may provide non-identifying associations that may be used by relying party 706 or others for determining trends, non-identity-based associations, or other information.

As shown in FIG. 7, verification operations performed by the verification endpoint 752 at the verification platform 708 may be stored in the audit log 722. These operations may include verification operations initiated through the user device communication interface 714 and/or relying party communication interface 712 as well as operations initiated through the identity verification device 754. Furthermore, the identification verification device 750 comprising a verification endpoint 752 may include an audit log 722 for local storage of tokens. In an example, the verification endpoint 752 of the identification verification device 750 may periodically (e.g., upon establishing a network connection) move or copy tokens stored locally to the audit log 722 of the verification platform 708.

Figure 8:
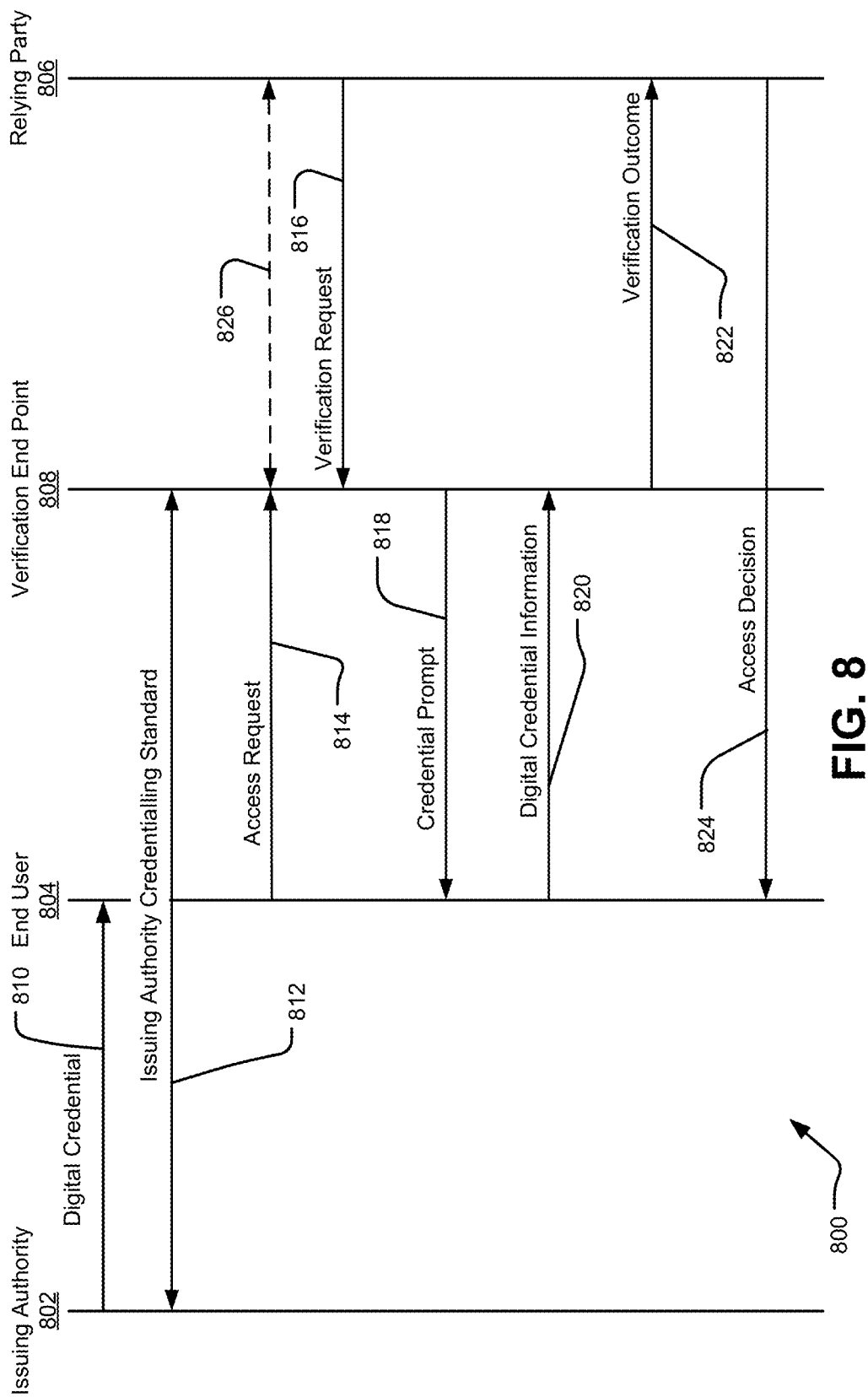
FIG. 8 illustrates an example data flow related to digital identity verification.

With further reference to FIG. 8, an example data flow 800 related to digital identity verification is shown. In FIG. 8, an issuing authority 802 provides a digital credential 810 to an end user 804. In addition, an issuing authority credentialing standard is provided from the issuing authority 802 to a verification endpoint 808 (e.g., an identification verification device or a verification platform). As noted above, the digital credential 810 may be pushed to the verification endpoint 808, pulled from the verification endpoint 808, or otherwise provided. Additionally, while the digital credential 810 is shown being provided chronologically prior to the issuing authority credentialing standard 812, it may be appreciated that this order is not required and the issuing authority credentialing standard 812 may be communicated prior to the digital credential 810 being provided to the end user 804.

Also, the end user 804 may communicate an access request 814. As shown, the access request 814 may be provided directly to the verification endpoint 808. Alternatively, the access request 814 may be provided to a relying party 806. A potential connection 826 is shown between the relying party 806 and verification endpoint 808. For instance, the potential connection 826 may include APIs or other interfaces (e.g., web protocols) that allow an interface from the verification end point 808 to be deployed at the relying party 806 (e.g., at a kiosk, website, or other asset of the relying party 806). For instance, a branded site provided by the verification endpoint 808 may be accessed by the end user 804 when communicating the access request 814 such that a seamless integration of the verification endpoint 808 is provided by the relying party 806. In any regard, the access request 814 may require verification of the identity of the end user 804. In this regard, the access request 814 may include any transaction in which the end user 804 is to be at least partially identified by the relying party 806. In this regard, the access request 814 may correspond to any existing transaction in which a physical identification would be produced and verified. Furthermore, the access request 814 may correspond with establishing and/or gaining access to an account. The data flow 800 may be described in connection with a multifactor authentication process in which the digital credential 810 is used as a factor in authenticating the end user 804. Accordingly, the access request 814 may comprise a request to establish an account at the relying party 806 or to access a previously established account using the digital credential 810 previously associated with the account. In other examples, the access request 814 may correspond with requests to access other assets such as requiring the end user 804 to be verified prior to joining a conference call or prior to accessing some other resource (e.g., another web resource).

Once the relying party 806 has received the access request 814, the relying party 806 may communicate a verification request 816 to the verification endpoint 808. The verification request 816 may include information regarding the end user 804 from which the access request 814 is received as well as the information sought in the verification (e.g., the age, name, etc. of the end user 804). The verification endpoint 808 may then provide a credential prompt 818 to the end user 804. The credential prompt 818 may be communicated via an SMS message, email, through a push notification of a proprietary application, or other modality. The credential prompt 818 may prompt the end user 804 to select the digital credential 810 to be provided for the verification operation. The end user 804 may select the digital credential 810 from any appropriate application, wallet, or other repository of the digital credential. In turn, digital credential information 820 selected by the end user 804 in response to the credential prompt 818 is communicated to the verification endpoint 808. As noted above, the digital identity 820 may be limited to requested information that has been authorized to share by the end user 804 after being prompted for allowance to share specific information from the digital credential 810 with the relying party 806.

The verification endpoint 808 may then perform a verification operation using the issuing authority credentialing standard 812 from the issuing authority 802 for the digital credential information 820 and the digital credential information 820 provided by the end user 804 in response to the credential prompt 818. Upon completion of the verification operation at the verification endpoint 808, a verification outcome 822 may be returned to the relying party 806 informing the relying party 806 as to whether the digital credential information 820 was verified in relation to the verification request 816. In turn, the relying party 806 may provide an access decision 824 to the end user 804 either providing or denying access to the access request 814 based on the verification outcome 822.

Figure 9:
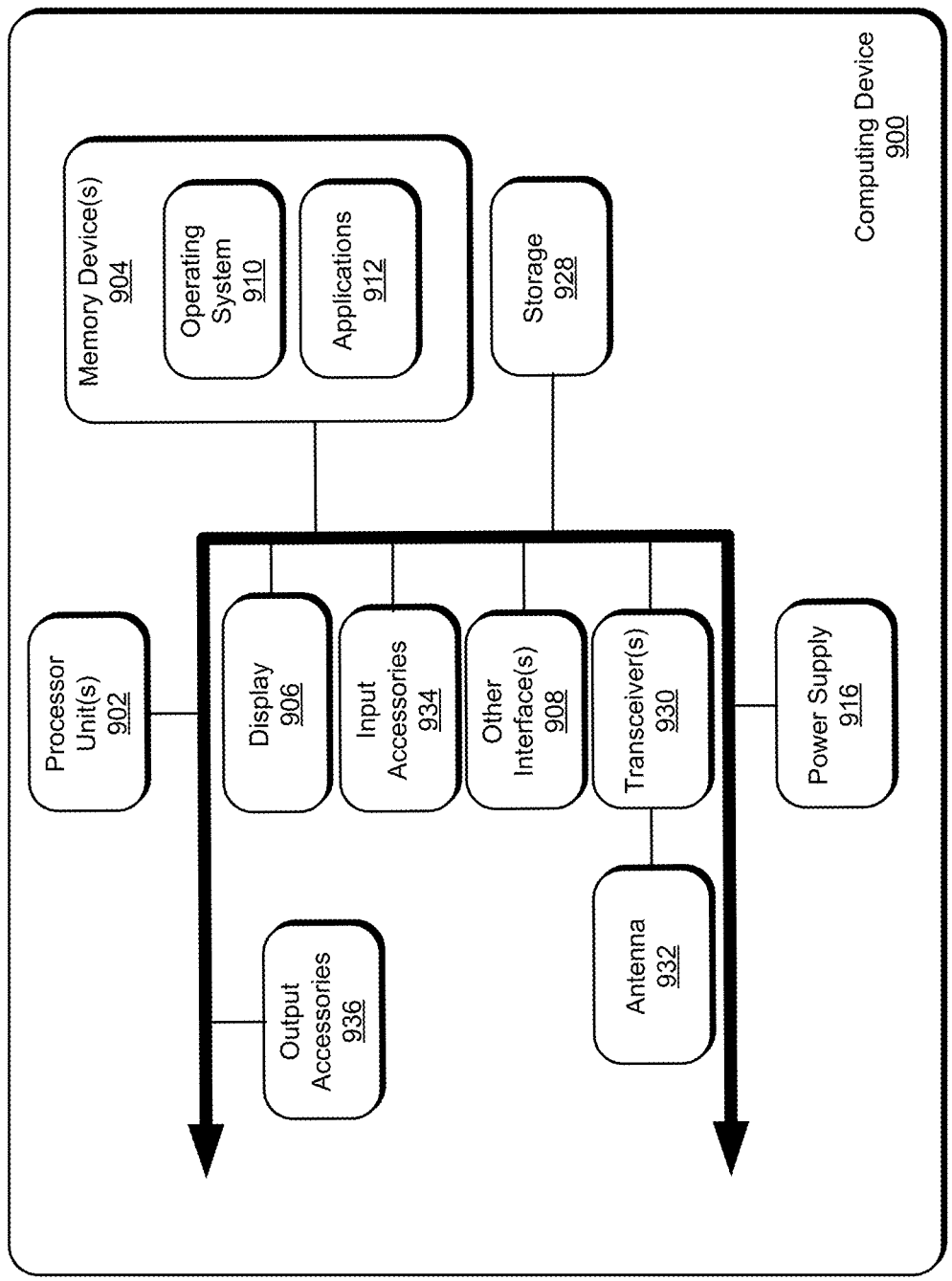
FIG. 9 illustrates an example schematic of a computing device suitable for implementing aspects of the disclosed technology.

FIG. 9 illustrates an example schematic of a computing device 900, such as a point-of-service device or remote computer server platform, suitable for implementing aspects of the disclosed technology including a verification endpoint 450 (e.g., including a verification engine and/or the communication interfaces) as described above. The computing device 900 includes one or more processor unit(s) 902, memory 904, a display 906, and other interfaces 908 (e.g., a touch screen). The memory 904 generally includes both volatile memory (e.g., RAM) and non-volatile memory (e.g., flash memory). An operating system 910, for example, Android® mobile software, Apple® iOS™, Linux™, or a point-of-sale operating system, resides in the memory 904 and is executed by the processor unit(s) 902, although it should be understood that other operating systems may be employed.

One or more applications 912 are loaded in the memory 904 and executed on the operating system 910 by the processor unit(s) 902. Applications 912 may include a point-of-service identification verification application that configures and leverages functionality provided by the operating system 910 to confirm the identity of an end user.

Applications 912 may receive input from various input accessories 934, e.g., local devices such as a microphone, a camera, a keypad, a mouse, a touchscreen, a stylus, a joystick, an instrument mounted input, or the like, to implement the functionality of the point-of-service identification verification application. The computing device 900 may, in addition to the display 906, include various other output accessories 936 including, for example, an audio amplifier and loudspeaker and/or audio jack and a printer. Additionally, the applications 912 may receive input from one or more remote devices such as remotely-located smart devices by communicating with such devices over a wired or wireless network using one or more communication transceivers 930 and an antenna 932 to provide network connectivity (e.g., via a mobile phone network, Wi-Fi®, Bluetooth®, near field communications, etc.).

The computing device 900 further includes a power supply 916, which may be powered by one or more batteries or other power sources and which provides power to other components of the computing device 900. The power supply 916 may also be connected to an external power source (not shown) that overrides or recharges the built-in batteries or other power sources.

The computing device 900 may further be connected to additional external memory storage devices 928. In an example implementation, the computing device 900 comprises hardware and/or software embodied by instructions stored in the memory 904 and/or the storage devices 928 and processed by the processor unit(s) 902. The memory 904 may be the memory of a host device or of an accessory that couples to the host. Additionally, or alternatively, the computing device 900 may comprise one or more field programmable gate arrays (FGPAs), application specific integrated circuits (ASIC), or other hardware/software/firmware capable of providing the functionality described herein.

The memory 904 and storage 928 of the computing device 900 may include a variety of tangible processor-readable storage media. Tangible processor-readable storage can be embodied by any available media that can be accessed by the computing device 900 and includes both volatile and non-volatile storage media, removable and non-removable storage media implemented in any method or technology for storage of information such as processor-readable instructions, data structures, program modules or other data. Tangible processor-readable storage media excludes intangible communications signals. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the information and which can be accessed by the computing device 900. In contrast to tangible processor-readable storage media, intangible, processor-readable, communication signals may embody processor-readable instructions, data structures, program modules or other data resident in a modulated data signal, such as a carrier wave or other signal transport medium or mechanism. The term "modulated data signal" means an intangible communications signal that has one or more of its characteristics set or changed in such a manner as to encode information in the signal. By way of example, and not limitation, intangible communication signals include signals traveling through wired media such as a wired network or direct-wired connection, and wireless media such as acoustic, radio frequency, infrared, and other wireless media.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

In some aspects, the techniques described herein relate to an identity verification device for verification of a digital credential including a computer processor; a memory storing an application executable by the computer processor to implement a verification process that verifies authenticity of the digital credential; a user device communication interface for operative communication with a user device associated with a human user, the user device communication interface operative to receive from the user device the digital credential of the human user stored locally on the user device; and a relying party communication interface operative to send a request to an intermediary credential service platform for verification of the digital credential presented by the user device, wherein the request includes an indication of a specific issuing authority credential standard required by the identity verification device according to a configuration prescribed by a relying party associated with the identity verification device; and to receive verification of the digital credential from the intermediary credential service platform after application of the issuing authority credentialing standard to the digital credential, wherein the issuing authority credentialing standard is selected from a plurality of issuing authority credentialing standards stored in a digital identity credentialing database maintained by the intermediary credential service platform; and a verification indicator operative to provide an indication of verification status to the relying party associated with the identity verification device.

In some aspects, the techniques described herein relate to an identity verification device, wherein the user device communication interface includes a sensor imager configured to read a one- or two-dimensional image code presented on a video screen of the user device.

In some aspects, the techniques described herein relate to an identity verification device, wherein the user device communication interface includes a near field communication transceiver configured to wirelessly communicate with the user device to receive the digital credential.

In some aspects, the techniques described herein relate to an identity verification device, wherein the user device communication interfaces includes a radio frequency transceiver to communicate over Wi-Fi or Bluetooth communication standards with the user device.

In some aspects, the techniques described herein relate to an identity verification device, wherein the verification indicator includes a video screen operative to present a perceptible image indicative of verification status.

In some aspects, the techniques described herein relate to an identity verification device, wherein the verification indicator includes a loudspeaker to provide an audible indication of verification status.

In some aspects, the techniques described herein relate to an identity verification device, wherein the relying party communication interface includes a wireless communication transceiver for interfacing with a communication network to communicate with the intermediary credential service platform.

In some aspects, the techniques described herein relate to an identity verification device, wherein the digital credential includes a cryptographically secure digital document issued to correspond to the human user and stored on the user device.

In some aspects, the techniques described herein relate to an identity verification device, wherein the digital credential is managed by an identification application installed on the user device; and the user device communication interface receives the cryptographically secure digital document selected by the identification application from a plurality of cryptographically secure digital documents stored by the identification application to correspond to a credentialing standard requested by the identity verification device.

In some aspects, the techniques described herein relate to an identity verification device, wherein the digital credential is received by the user device communication interface after selection and initiation of transmission of the digital credential by the human user on the user device.

In some aspects, the techniques described herein relate to an identity verification device, wherein the user digital credential selection is prompted by the user device communication interface in response to receipt of the request for verification of the human user's identity from the relying party.

In some aspects, the techniques described herein relate to an identity verification device, wherein the digital credential is selected from any one of a plurality of digital credentials of the human user stored on the user device.

In some aspects, the techniques described herein relate to an identity verification device, wherein the request includes a discrete information request relating to less than all identifying information provided by the digital credential; the verification received includes only information corresponding to the discrete information request; and the verification indicator provides only information corresponding to the discrete information request.

In some aspects, the techniques described herein relate to an identity verification device, wherein the identity verification device receives authorization for utilization of the discrete information request before sending the request to the intermediary credential service platform.

In some aspects, the techniques described herein relate to an identity verification device further including a biometric information sensor for collecting user biometric information from the human user, and wherein the digital credential is associated with stored biometric information related to the human user; and the biometric sensor collects and provides the user biometric information from the human user using the user device in the request to the intermediary credential service platform for comparison of the user biometric information to the stored biometric information to determine a match as part of the verification of the digital credential.

In some aspects, the techniques described herein relate to an identity verification device, wherein the biometric information sensor includes a camera for capturing an image of a face of the human user for facial recognition as the biometric information.

In some aspects, the techniques described herein relate to an identity verification device, wherein the biometric information sensor includes a fingerprint sensor for capturing an image of a fingerprint of the human user as the biometric information.

In some aspects, the techniques described herein relate to an identification verification device for verification of a user digital credential including a computer processor; a memory storing a standards abstraction layer including a digital identity credentialing database including a plurality of issuing authority credentialing standards that each define verification of digital credentials issued by an issuing authority; and a verification engine application executable by the computer processor to implement a verification process that verifies authenticity of the digital credential; a verification engine implemented by the processor according to the verification engine application and operative to access the digital identity credentialing database and retrieve an issuing authority credentialing standard associated with the user digital credential and apply the issuing authority credentialing standard to the user digital credential to perform a verification operation on the user digital credential and output a verification status; a user device communication interface for operative communication with a user device associated with a human user, the user device communication interface operative to receive from the user device the user digital credential of the human user stored locally on the user device; and a verification indicator operative to provide an indication of the verification status to the relying party associated with the identification verification device.

In some aspects, the techniques described herein relate to an identification verification device, wherein the user device communication interface includes a sensor imager configured to read a one- or two-dimensional image code presented on a video screen of the user device.

In some aspects, the techniques described herein relate to an identification verification device, wherein the user device communication interface includes a near field communication transceiver configured to wirelessly communicate with the user device to receive the digital credential.

In some aspects, the techniques described herein relate to an identification verification device, wherein the user device communication interface includes a radio frequency transceiver to communicate over Wi-Fi or Bluetooth communication standards with the user device.

In some aspects, the techniques described herein relate to an identification verification device, wherein the verification indicator includes a video screen operative to present a perceptible image indicative of verification status.

In some aspects, the techniques described herein relate to an identification verification device, wherein the verification indicator includes a loudspeaker to provide an audible indication of verification status.

In some aspects, the techniques described herein relate to an identification verification device, wherein the digital credential includes a cryptographically secure digital document issued to correspond to the human user and stored on the user device.

In some aspects, the techniques described herein relate to an identification verification device, wherein the digital credential is managed by an identification application installed on the user device; and the user device communication interface receives the cryptographically secure digital document selected by the identification application from a plurality of cryptographically secure digital documents stored by the identification application to correspond to a credentialing standard requested by the identification verification device.

In some aspects, the techniques described herein relate to an identification verification device, wherein the digital credential is received by the user device communication interface after selection and initiation of transmission of the digital credential by the human user on the user device.

In some aspects, the techniques described herein relate to an identification verification device, wherein the digital credential is selected from any one of a plurality of digital credentials of the human user stored on the user device.

In some aspects, the techniques described herein relate to an identification verification device, wherein the verification engine is configured to limit information presented to the relying party based upon a preconfigured information request of the relying party; the verification status provided by the verification engine includes only information corresponding to the preconfigured information request; and the verification indicator provides only information provided by the verification status.

In some aspects, the techniques described herein relate to an identification verification device further including a biometric information sensor for collecting user biometric information from the human user, and wherein the digital credential is associated with the stored biometric information related to the human user; the biometric sensor collects and provides the user biometric information from the human user using the user device to the verification engine; the verification engine is further configured to compare the user biometric information to the stored biometric information to determine a match as part of the verification operation.

In some aspects, the techniques described herein relate to an identification verification device, wherein the biometric information sensor includes a camera for capturing an image of a face of the human user for facial recognition as the user biometric information.

In some aspects, the techniques described herein relate to an identification verification device, wherein the biometric information sensor includes a fingerprint sensor for capturing an image of a fingerprint of the human user as the user biometric information.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details.

While this specification contains many specific implementation details, these should not be construed as limitations on the scope of any technologies or of what may be claimed, but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. The various exemplary methods described and/or illustrated here may also omit one or more of the steps described or illustrated here or include additional steps in addition to those disclosed. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The above specification, examples and data provide a complete description of the structure and use of exemplary embodiments of the invention as defined in the claims. Although various embodiments of the claimed invention have been described above with a certain degree of particularity, or with reference to one or more individual embodiments, other embodiments using different combinations of elements and structures disclosed herein are contemplated, as other iterations can be determined through ordinary skill based upon the teachings of the present disclosure. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. An identity verification device for verification of a digital credential, comprising:
   a computer processor;
   a memory storing an application executable by the computer processor to implement a verification process that verifies authenticity of the digital credential;
   a user device communication interface for operative communication with a user device associated with a human user, the user device communication interface operative to receive, from the user device, proffered digital credential information of the digital credential of the human user stored locally on the user device; and
   a relying party communication interface operative:
      to provide a request for verification of the proffered digital credential information to an intermediary credential service platform for verification of the proffered digital credential information presented by the user device, wherein the request includes an indication of an issuing authority credential standard associated with an issuing authority of the digital credential and requested identity information according to a configuration prescribed by a relying party associated with the identity verification device, and
      to receive verification of the digital credential from the intermediary credential service platform after application of the issuing authority credentialing standard to the proffered digital credential information, wherein the issuing authority credentialing standard is selected from a plurality of issuing authority credentialing standards stored in a digital identity credentialing database maintained by the intermediary credential service platform and the issuing authority credentialing standard defines a manner in which the digital credential issued by the issuing authority of the digital credential is to be validated for verification of the authenticity of the digital credential; and
   a verification indicator operative to provide an indication of verification status to the relying party associated with the identity verification device with the requested identity information.

2. The identity verification device of claim 1, wherein the user device communication interface comprises a sensor imager configured to read a one-or two-dimensional image code presented on a video screen of the user device.

3. The identity verification device of claim 1, wherein the user device communication interface comprises a near field communication transceiver configured to wirelessly communicate with the user device to receive the digital credential.

4. The identity verification device of claim 1, wherein the verification indicator comprises a video screen operative to present a perceptible image indicative of the verification status and the requested identity information.

5. The identity verification device of claim 1, wherein the verification indicator comprises a loudspeaker to provide an audible indication of verification status and the requested identity information.

6. The identity verification device of claim 1, wherein the relying party communication interface comprises a wireless communication transceiver for interfacing with a communication network to communicate with the intermediary credential service platform.

7. The identity verification device of claim 1, wherein the digital credential comprises a cryptographically secure digital document issued to correspond to the human user and stored on the user device.

8. The identity verification device of claim 7, wherein
the digital credential is managed by an identification application installed on the user device; and
the user device communication interface receives the cryptographically secure digital document selected by the identification application from a plurality of cryptographically secure digital documents stored by the identification application to correspond to a credentialing standard requested by the identity verification device.

9. The identity verification device of claim 1, wherein the digital credential is received by the user device communication interface after selection and initiation of transmission of the digital credential by the human user on the user device.

10. The identity verification device of claim 1, wherein the user digital credential selection is prompted by the user device communication interface in response to receipt of the request for verification of the human user's identity from the relying party.

11. The identity verification device of claim 1, wherein the digital credential is selected from any one of a plurality of digital credentials of the human user stored on the user device.

12. The identity verification device of claim 1, wherein
the requested identity information comprises less than all identifying information provided by the digital credential;
the verification received includes only information corresponding to the requested identity information; and
the verification indicator provides only the requested identity information from the identifying information provided by the digital credential.

13. The identity verification device of claim 12, wherein the identity verification device receives authorization for utilization of the requested identity information from the user device before sending the request to the intermediary credential service platform.

14. The identity verification device of claim 1 further comprising
a biometric information sensor for collecting user biometric information from the human user, and wherein
the digital credential is associated with stored biometric information related to the human user; and
the biometric sensor collects and provides the user biometric information from the human user using the user device in the request to the intermediary credential service platform for comparison of the user biometric information to the stored biometric information to determine a match as part of the verification of the digital credential.

15. The identity verification device of claim 14, wherein the biometric information sensor comprises a camera for capturing an image of a face of the human user for facial recognition as the biometric information.

16. The identity verification device of claim 1, further comprising:
a physical document reader for reading physical identification documents at the identity verification device.

17. An identification verification device for verification of a user digital credential comprising
a computer processor;
a memory storing
a standards abstraction layer comprising a digital identity credentialing database including a plurality of issuing authority credentialing standards that each define a manner in which a digital credentials issued by a corresponding issuing authority is to be validated for verification of the digital credential; and
a verification engine application executable by the computer processor to implement a verification process that verifies authenticity of the digital credential;
a verification engine implemented by the processor according to the verification engine application and operative to access the digital identity credentialing database and retrieve an issuing authority credentialing standard from the plurality of issuing authority credentialling standards associated with the user digital credential and apply the issuing authority credentialing standard to the user digital credential to perform a verification operation on the user digital credential as defined by the issuing authority credentialling standard and output a verification status;
a user device communication interface for operative communication with a user device associated with a human user, the user device communication interface operative to receive from the user device the user digital credential of the human user stored locally on the user device; and
a verification indicator operative to provide an indication of the verification status to a relying party associated with the identification verification device.

18. The identification verification device of claim 17, wherein the user device communication interface comprises a sensor imager configured to read a one-or two-dimensional image code presented on a video screen of the user device.

19. The identification verification device of claim 17, wherein the user device communication interface comprises a near field communication transceiver configured to wirelessly communicate with the user device to receive the digital credential.

20. The identification verification device of claim 17, wherein the user device communication interface comprises a radio frequency transceiver to communicate over Wi-Fi or Bluetooth communication standards with the user device.

21. The identification verification device of claim 17, wherein the verification indicator comprises a video screen operative to present a perceptible image indicative of verification status.

22. The identification verification device of claim 17, wherein the verification indicator comprises a loudspeaker to provide an audible indication of verification status.

23. The identification verification device of claim 17, wherein the digital credential comprises a cryptographically secure digital document issued to correspond to the human user and stored on the user device.

24. The identification verification device of claim 23, wherein
the digital credential is managed by an identification application installed on the user device; and
the user device communication interface receives the cryptographically secure digital document selected by the identification application from a plurality of cryptographically secure digital documents stored by the identification application to correspond to a credentialing standard requested by the identification verification device.

25. The identification verification device of claim 17, wherein the digital credential is received by the user device communication interface after selection and initiation of transmission of the digital credential by the human user on the user device.

26. The identification verification device of claim 17, wherein the digital credential is selected from any one of a plurality of digital credentials of the human user stored on the user device.

27. The identification verification device of claim 17, wherein
the verification engine is configured to limit information presented to the relying party based upon a preconfigured information request of the relying party;
the verification status provided by the verification engine includes only information corresponding to the preconfigured information request; and
the verification indicator provides only information provided by the verification status.

28. The identification verification device of claim 17, further comprising
a biometric information sensor for collecting user biometric information from the human user, and wherein
the digital credential is associated with the stored biometric information related to the human user;
the biometric sensor collects and provides the user biometric information from the human user using the user device to the verification engine;
the verification engine is further configured to compare the user biometric information to the stored biometric information to determine a match as part of the verification operation.

29. The identification verification device of claim 28, wherein the biometric information sensor comprises a camera for capturing an image of a face of the human user for facial recognition as the user biometric information.

30. The identification verification device of claim 28, wherein the biometric information sensor comprises a fingerprint sensor for capturing an image of a fingerprint of the human user as the user biometric information.

* * * * *